United States Patent
Sugahara et al.

(10) Patent No.: US 11,820,023 B2
(45) Date of Patent: Nov. 21, 2023

(54) ROBOT SYSTEM AND COMPUTER PROGRAM PRODUCT

(71) Applicant: KABUSHIKI KAISHA TOSHIBA, Tokyo (JP)

(72) Inventors: Atsushi Sugahara, Kawasaki Kanagawa (JP); Hideichi Nakamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 270 days.

(21) Appl. No.: 17/005,361

(22) Filed: Aug. 28, 2020

(65) Prior Publication Data
US 2021/0245365 A1 Aug. 12, 2021

(30) Foreign Application Priority Data

Feb. 10, 2020 (JP) .................................. 2020-020644

(51) Int. Cl.
*B25J 13/08* (2006.01)
*B25J 9/16* (2006.01)
*B25J 19/02* (2006.01)

(52) U.S. Cl.
CPC ............ *B25J 9/1692* (2013.01); *B25J 9/161* (2013.01); *B25J 9/163* (2013.01); *B25J 9/1612* (2013.01); *B25J 13/089* (2013.01); *B25J 19/023* (2013.01)

(58) Field of Classification Search
CPC ........ B25J 9/1692; B25J 9/161; B25J 9/1612; B25J 9/163; B25J 13/089; B25J 19/023;
(Continued)

(56) References Cited

U.S. PATENT DOCUMENTS

2007/0280812 A1* 12/2007 Morency ................ B65G 61/00
    414/729
2018/0272535 A1* 9/2018 Ogawa .................. B25J 13/085
(Continued)

FOREIGN PATENT DOCUMENTS

EP       1 340 700 A1    9/2002
JP     2014-205209 A    10/2014
(Continued)

OTHER PUBLICATIONS

Zeng et al., "Learning Synergies between Pushing and Grasping with Self-supervised Deep Reinforcement Learning," arXiv:1803.09956v3 (Sep. 30, 2018), 9 pages.
(Continued)

*Primary Examiner* — Jonathan L Sample
*Assistant Examiner* — Matthew C Gammon
(74) *Attorney, Agent, or Firm* — Finnegan, Henderson, Farabow, Garrett & Dunner, LLP

(57) ABSTRACT

A robot system includes a robot including a plurality of fingers for holding a target object and a control device configured to control a motion of the robot. The control device includes one or more processors. The processors acquire an image of a first target object and a second target object taken by an imaging device. The processors control the motion of the robot based on the image such that the robot moves the first target object with at least one finger included in the fingers in a direction in which a gap is formed between the first target object and the second target object, inserts at least one finger included in the fingers into the gap, and holds the first target object.

10 Claims, 28 Drawing Sheets

(58) Field of Classification Search
CPC ........ B25J 13/081; B25J 15/08; B25J 9/1697; B25J 15/00; B25J 15/0253; B25J 15/026; B25J 15/06; B25J 15/0616; B25J 15/10; G05B 2219/39486; G05B 2219/40609
See application file for complete search history.

(56) References Cited

U.S. PATENT DOCUMENTS

| | | | |
|---|---|---|---|
| 2020/0078935 A1* | 3/2020 | Kimura | B25J 9/1687 |
| 2020/0114508 A1 | 4/2020 | Kawabata et al. | |
| 2020/0130192 A1 | 4/2020 | Ogawa et al. | |
| 2020/0171652 A1* | 6/2020 | Kawabata | B25J 15/103 |
| 2021/0053215 A1* | 2/2021 | Kim | B25J 9/1687 |

FOREIGN PATENT DOCUMENTS

| | | |
|---|---|---|
| JP | 2018-158391 A | 10/2018 |
| WO | WO 2018/212203 A1 | 11/2018 |
| WO | WO 2019/107454 A1 | 6/2019 |

OTHER PUBLICATIONS

Rahmatizadeh et al., "Vision-Based Multi-Task Manipulation for Inexpensive Robots Using End-to-End Learning from Demonstration," arXiv:1707.02920v2 (Apr. 22, 2018), 8 pages.

\* cited by examiner

ROBOT SYSTEM AND COMPUTER PROGRAM PRODUCT

CROSS-REFERENCE TO RELATED APPLICATIONS

This application is based upon and claims the benefit of priority from Japanese Patent Application No. 2020-020644, filed on Feb. 10, 2020; the entire contents of which are incorporated herein by reference.

FIELD

Embodiments described herein relate generally to a robot system and a computer program product.

BACKGROUND

In factories and distribution centers, robots take out holding target objects, such as parts and products, from cardboard boxes and shelves. If a holding target object is relatively large and has a flat surface, a robot can take out the holding target object by causing it to adhere to a suction cup provided to a robot hand. If a holding target object is a cylindrical object, such as a bolt, and the objects are loaded in bulk, the robot can hold the holding target object by sandwiching it with two fingers of the robot hand.

The robots according to the conventional technologies, however, may possibly fail to appropriately hold the holding target object. If the flat surface of the holding target object is small, and a plurality of holding target objects are placed with no gap therebetween, or if a plurality of holding target objects fall down and overlap one another, for example, the robots fail to cause the holding target object to be held next alone to adhere to the suction cup. In this case, the robots also fail to hold the holding target object by inserting the two fingers of the robot hand between the holding target objects.

DETAILED DESCRIPTION

According to one embodiment, a robot system according to an embodiment includes a robot including a plurality of fingers for holding a target object and a control device configured to control a motion of the robot. The control device includes one or more processors. The processors acquire an image of a first target object and a second target object taken by an imaging device. The processors control the motion of the robot based on the image such that the robot moves the first target object with at least one finger included in the fingers in a direction in which a gap is formed between the first target object and the second target object, inserts at least one finger included in the fingers into the gap, and holds the first target object.

Exemplary embodiments of a robot system according to the present invention are described below in greater detail with reference to the accompanying drawings.

First Embodiment

A robot system according to a first embodiment uses a finger (third finger) provided besides fingers (first finger and second finger) for holding a holding target object and moves (e.g., tilts, translates (slides), and rotates) the holding target object to a position where it can be held with the first finger and the second finger.

If there is no gap between the holding target object and another object, for example, the robot system moves the holding target object with the third finger to create a gap between the holding target object and the other object. By inserting the first finger or the second finger into the gap, the robot system can hold the holding target object. If a plurality of holding target objects fall down and overlap one another (e.g., if the holding target objects fall over like dominos), the robot system moves and raises the holding target object with the third finger. The robot system according to the present embodiment has a function of learning a model (e.g., a neural network) for deriving a motion sequence of a robot to enable the motions described above.

With this configuration, the robot system can avoid a situation where manual holding needs to be performed because holding by the robot is difficult. As a result, the robot system can significantly progress automation in holding work (picking work) for the holding target object in factories and distribution centers, for example.

In the present embodiment, it is not necessary to include an actuator (e.g., a motor) that independently operates the third finger and can move the third finger by an actuator common to the first finger and the second finger, for example. Consequently, the motions described above can be achieved with a simpler configuration.

In the present embodiment, the holding target object is held by being sandwiched (clamped) between two fingers (the first finger and the second finger). Holding includes causing the holding target object to adhere to a suction cup, for example. Examples using the suction cup will be described in a second embodiment.

Figure 1:
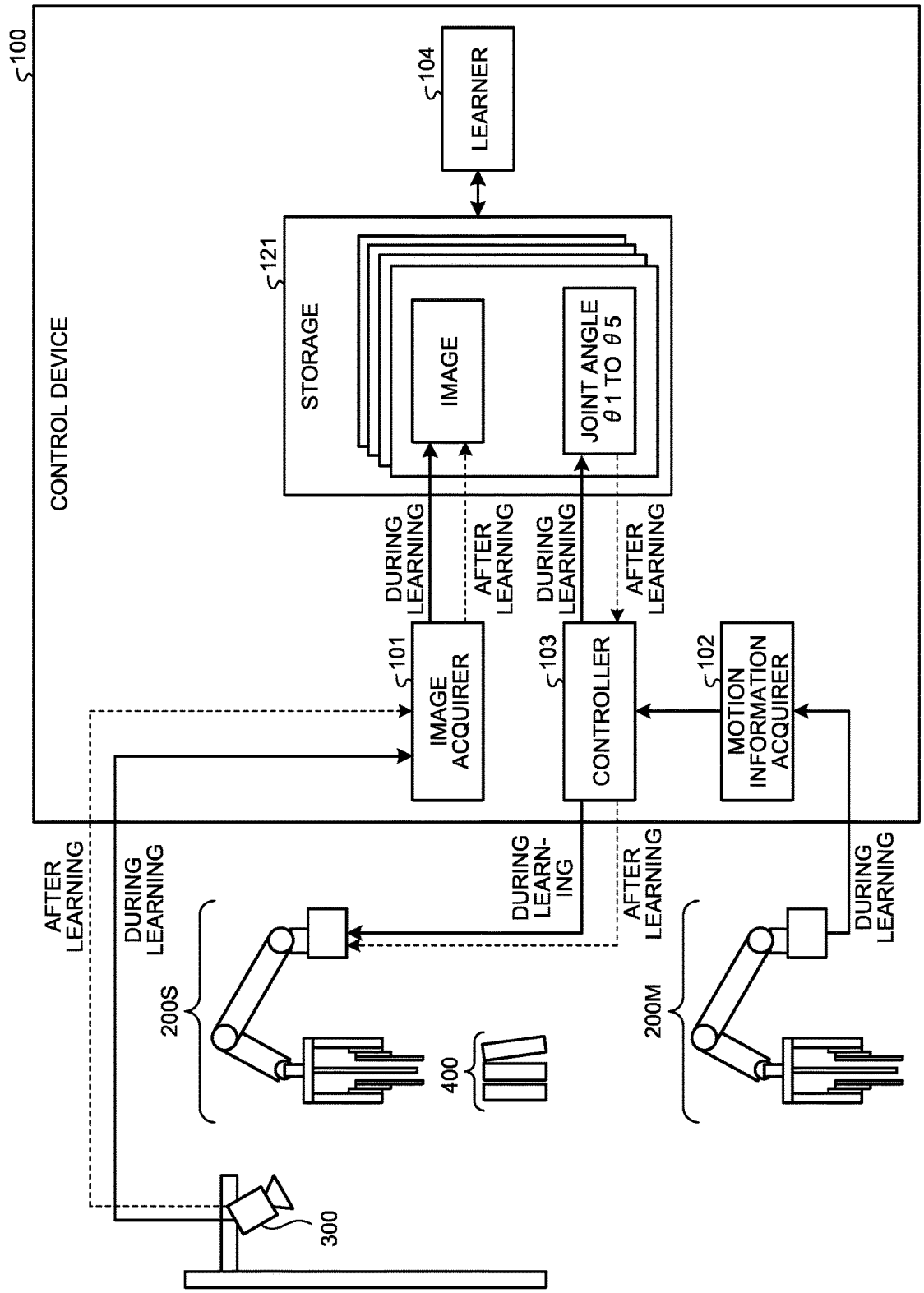
FIG. 1 is a block diagram of a robot system according to a first embodiment.

FIG. 1 is a block diagram of an example of the entire configuration of the robot system according to the first embodiment. As illustrated in FIG. 1, the robot system includes a control device 100, two robots 200M and 200S, and a camera 300.

The devices (the control device 100, the robots 200M and 200S, and the camera 300) are connected via a network, such as a local area network (LAN) and the Internet. The network may be a wired or wireless network. Instead of or besides the network, the devices may be connected via dedicated lines.

The robot 200M and the robot 200S operate as a master and a slave, respectively, and have the same configuration. The robots 200M and 200S may be simply referred to as a robot 200 when they need not be distinguished from each other.

The camera 300 is an example of an imaging device that images a motion of the robot 200 (robot 200S in FIG. 1) holding a holding target object 400. The camera 300 may be mounted on the robot 200.

The control device 100 controls motions of the robot 200. When a user operates the robot 200M, for example, the control device 100 controls the robot 200S such that the robot 200S performs the same motion as the robot 200M. The robots 200M and 200S can be used to learn robot motions by imitation learning, for example. In imitation learning, the motion of the robot 200S is learned by imitating the motion of the robot 200M corresponding to the operation performed by the user, for example. In imitation learning, both of the robots 200M and 200S are required. In operation using the learning result (after learning), for example, at least one robot 200 to be operated (robot 200S in FIG. 1) is required.

The control device 100 includes storage 121, an image acquirer 101, a motion information acquirer 102, a controller 103, and a learner 104.

The storage 121 stores therein various kinds of information used for various kinds of processing in the control device 100. The storage 121, for example, stores therein images acquired by the image acquirer 101, motion information acquired by the motion information acquirer 102, and information indicating a neural network to be learned (e.g., parameters, such as weight, of the neural network). The storage 121 may be any generally used storage medium, such as a flash memory, a memory card, a random access memory (RAM), a hard disk drive (HDD), and an optical disc.

The image acquirer 101 acquires an image taken by the camera 300. The image acquirer 101, for example, acquires time-series images by imaging a motion of the robot 200 holding the holding target object 400. The acquired images are sequentially stored in the storage 121, for example.

The motion information acquirer 102 acquires motion information indicating a motion state of the robot 200. The motion information includes the joint angle of an arm joint included in the robot 200, for example. In learning, as illustrated in FIG. 1, the motion information acquirer 102 acquires the motion information on the robot 200M serving as a master. In operation using the learning result (after learning), the motion information acquirer 102 acquires the motion information on the robot 200 being operated.

The controller 103 controls motions of the robot 200. In learning, for example, the controller 103 refers to the motion information on the robot 200M acquired by the motion information acquirer 102 and operates the robot 200S such that the robot 200S gets into a motion state indicated by the motion information. In operation using the learning result (after learning), the controller 103 operates the robot 200 such that the robot 200 gets into a motion state indicated by the motion information derived using the learned neural network.

The learner 104 learns a neural network. The neural network is an example of a model that receives input information based on an image of the holding target object and outputs the motion information on the robot 200. The input information based on an image may be an image taken by the camera 300 or image information obtained by compressing the taken image (e.g., information indicating characteristics of the image). The learner 104, for example, inputs the image acquired by the image acquirer 101 to the neural network and learns the parameters (e.g., weight) of the neural network such that the error between the motion information output from the neural network and the motion information (corresponding to correct data) on the robot 200M acquired by the motion information acquirer 102 is smaller. An exemplary configuration of the neural network and an example of the learning method will be described later.

The units described above (the image acquirer 101, the motion information acquirer 102, the controller 103, and the learner 104) are provided by one or more processors, for example. The units may be provided by causing a processor such as a central processing unit (CPU) to execute a computer program, that is, by software. The units may be provided by a processor such as a dedicated integrated circuit (IC), that is, by hardware. The units may be provided by a combination of software and hardware. If a plurality of processors are used, the processors may each provide one of the units or two or more of them.

The units may be provided to different devices. Functions necessary for learning (e.g., the learner 104) and the other functions may be provided to two different devices in a distributed manner, for example.

Figure 2:
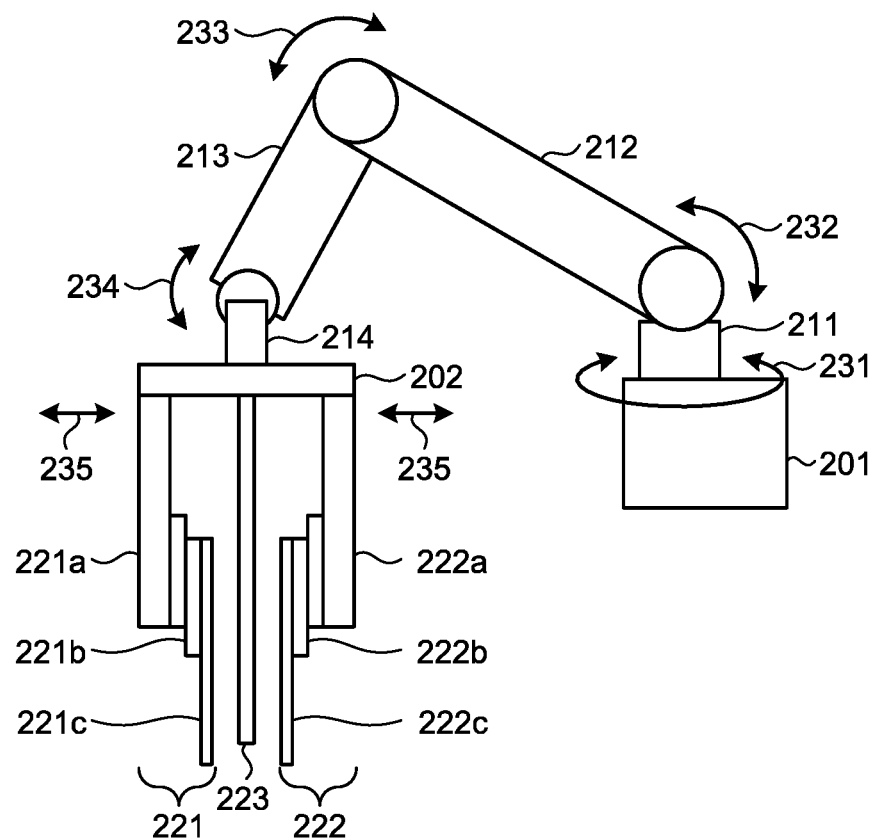
FIG. 2 is a schematic diagram of an exemplary configuration of a robot.

The following describes an exemplary configuration of the robot 200. FIG. 2 is a schematic diagram of an exemplary configuration of the robot 200. The robot 200 illustrated in FIG. 2 is an example of an articulated robot including five joints. The number of joints is not limited to five.

The robot 200 includes a housing 201, a plurality of arm joints 211 to 214, a support member 202, and a plurality of fingers 221, 222, and 223. The arm joints 211 to 214 are coupled to each other with any one of the joints interposed therebetween. The finger 221 includes a base 221a, a telescopic mechanism 221b, and an end portion 221c. The finger 222 includes a base 222a, a telescopic mechanism 222b, and an end portion 222c. Arrows 231 to 235 indicate motion directions of the five joints. The joint angles of the five joints are an example of the motion information and are acquired by the motion information acquirer 102 and stored in the storage 121, for example.

"Joint angles θ1 to θ5" illustrated in FIG. 1 indicate the joint angles of the five joints corresponding to the motion information stored as described above. As illustrated in FIG. 1, the motion information may be stored in association with an image taken at corresponding time.

The arm joints 211 to 214 are coupled in series. The support member 202 and the fingers 221, 222, and 223 are provided at the end of the arm joint 214. The support member 202 supports the fingers 221, 222, and 223. The fingers 221, 222, and 223 correspond to the first finger, the second finger, and the third finger, respectively.

The telescopic mechanisms 221b and 222b extend and contract the end portions 221c and 222c in a direction away from the support member 202 (extension) and a direction closer to the support member 202 (contraction). The telescopic mechanisms 221b and 222b correspond to a moving member that moves the fingers 221 and 222 relatively to the support member 202. The support member 202 and the fingers 221, 222, and 223 can be considered to constitute a hand provided at the end of the arm joint 214.

The arm joints 211 to 214 and the hand (the support member 202 and the fingers 221, 222, and 223) are an example of movable members. The positions and the postures of the respective movable members can be changed and maintained by operations of an actuator (driver) that drives the movable members. While the actuator is a motor, for example, it is not limited thereto. The actuator may be a pump with a motor, a solenoid, an electromagnetic valve with a solenoid, or a piston cylinder, for example. A drive controller (servo amplifier) that controls drive of the actuator is provided to the robot 200, for example.

The position and the posture of the hand can be changed within a movable range of the arm joints 211 to 214. If the user moves the arm joints while holding the end of the hand of the robot 200M serving as a master in learning, for example, the motion is transmitted to the robot 200S serving as a slave.

Figure 3:
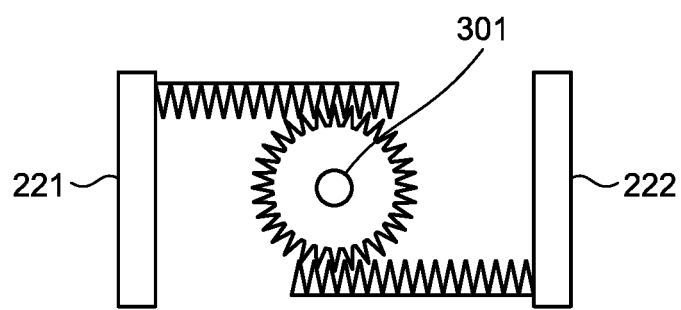
FIG. 3 is a schematic diagram of an exemplary configuration of a motor.

A motor (driver) that changes the space between the finger 221 and the finger 222 may be provided as one motor, for example. FIG. 3 is a schematic diagram of an exemplary configuration of the motor. As illustrated in FIG. 3, the motor that changes the space between the finger 221 and the finger 222 rotates about a rotation axis 301, thereby changing the space between the finger 221 and the finger 222 with gears.

Figure 4:
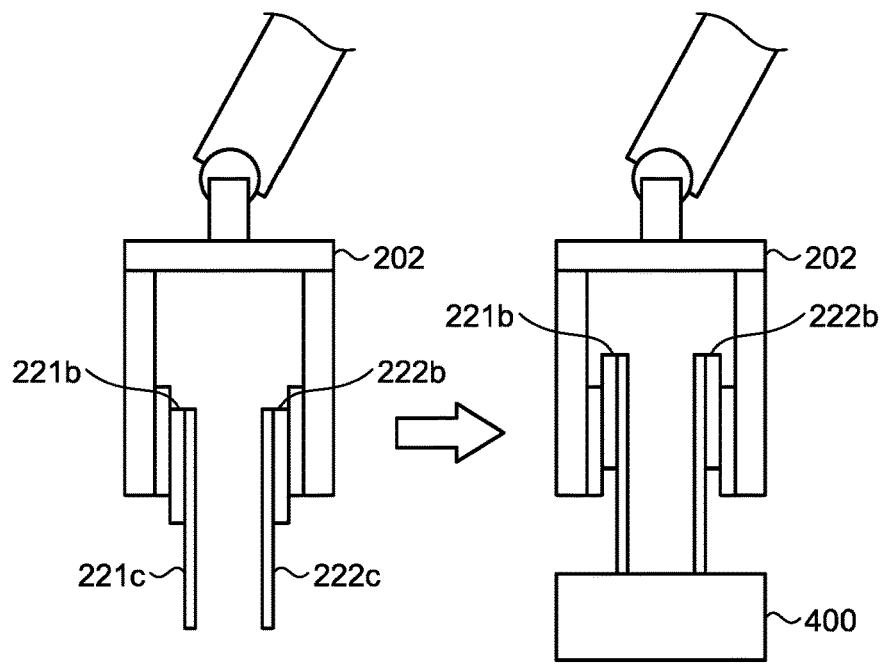
FIG. 4 is a schematic diagram for explaining a motion of telescopic mechanisms.
Figure 5:
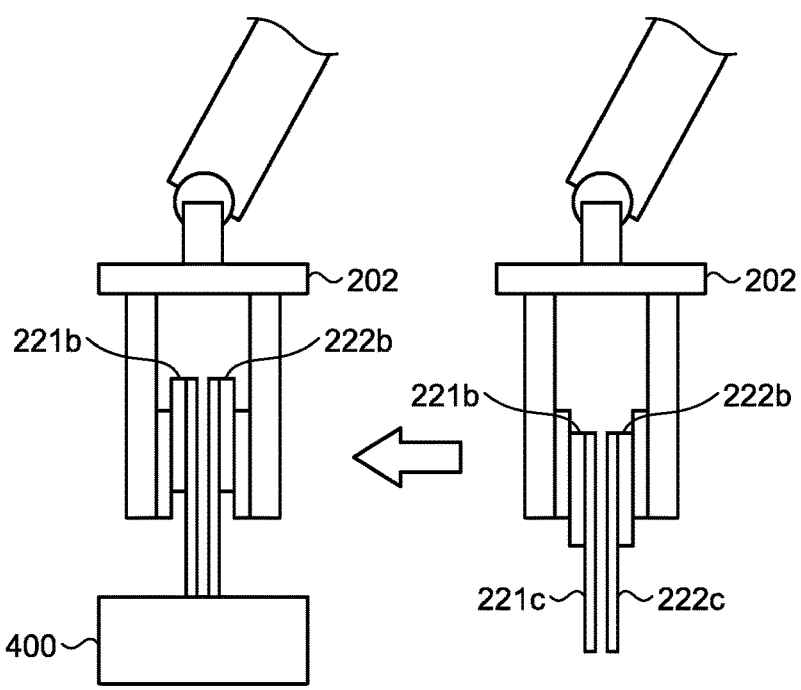
FIG. 5 is a schematic diagram for explaining a motion of the telescopic mechanisms.

The following describes the telescopic mechanisms 221b and 222b that extend and contract the fingers 221 and 222 corresponding to the first finger and the second finger. FIGS. 4 and 5 are schematic diagrams for explaining motions of the telescopic mechanisms 221b and 222b. FIGS. 4 and 5 do not illustrate the finger 223 for convenience of explanation.

FIG. 4 illustrates an exemplary motion of the telescopic mechanisms 221b and 222b performed when the space between the fingers 221 and 222 is wide (when the fingers are open). The telescopic mechanisms 221b and 222b extend the fingers 221 and 222 in a direction away from the support member 202 by gravity acting on themselves and the end portions 221c and 222c. When the end portions 221c and 222c come into contact with the holding target object 400, and the hand is moved in the direction toward the holding target object, the telescopic mechanisms 221b and 222b contract the fingers 221 and 222 in a direction closer to the support member 202 by force from the holding target object 400.

FIG. 5 illustrates an exemplary motion of the telescopic mechanisms 221b and 222b performed when the space between the fingers 221 and 222 is narrow (when the fingers are closed). The motion process of the telescopic mechanisms 221b and 222b is the same as that in FIG. 4.

As described above, in the present embodiment, the telescopic mechanisms 221b and 222b serving as passive mechanisms extended by gravity extend and contract the fingers 221 and 222. Consequently, it is not necessary to include actuators that extend and contract the fingers 221 and 222. The telescopic mechanisms 221b and 222b may extend the fingers 221 and 222 with an elastic member such as a spring.

Figure 6:
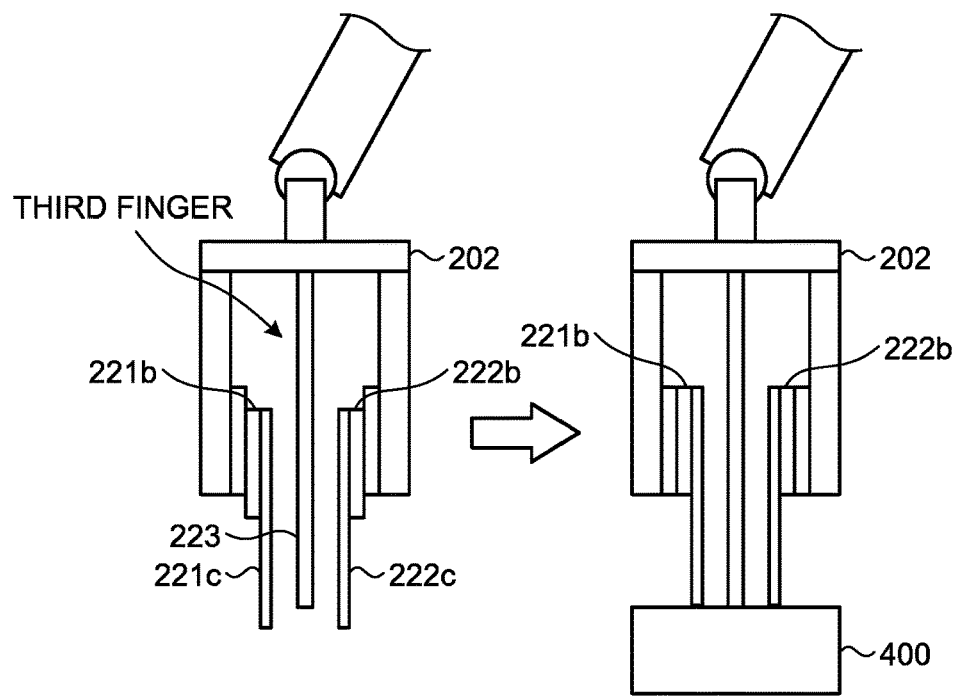
FIG. 6 is a schematic diagram for explaining a motion of a finger and the telescopic mechanisms.
Figure 7:
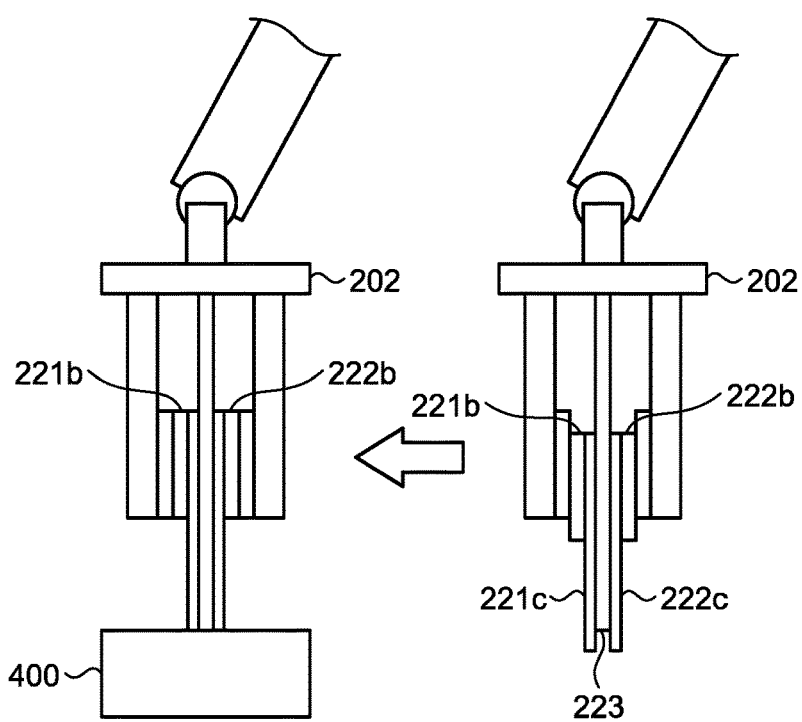
FIG. 7 is a schematic diagram for explaining a motion of the finger and the telescopic mechanisms.

The following describes a motion of the finger 223 serving as the third finger. FIGS. 6 and 7 are schematic diagrams for explaining a motion of the finger 223 and the telescopic mechanisms 221b and 222b. The finger 223 is used mainly for tilting the holding target object 400 and moving (translating) it in the horizontal direction.

FIG. 6 illustrates an exemplary motion of the finger 223 and the telescopic mechanisms 221b and 222b performed when the space between the fingers 221 and 222 is wide. As illustrated in FIG. 6, the ends of the end portions 221c and 222c are positioned in an outward direction with respect to the end of the finger 223 when they extend. The ends of the end portions 221c and 222c are positioned in an inward direction with respect to the end of the finger 223 when they contract. The outward (inward) direction indicates a direction away from the support member 202 (direction closer to the support member 202) when viewed in the extension direction of the fingers 221 and 222 with respect to the support member 202, for example.

When the end portions 221c and 222c come into contact with the holding target object 400, and the hand is moved in the direction toward the holding target object, the telescopic mechanisms 221b and 222b contract the fingers 221 and 222 in the direction closer to the support member 202. When the finger 223 comes into contact with the holding target object 400, contraction of the fingers 221 and 222 stops. The finger 223 is not extended or contracted because it is not connected to any telescopic mechanism or the like. By changing the position and the posture of the hand with the finger 223 in contact with the holding target object 400, the robot 200 can move (e.g., tilt, translate, and rotate) the holding target object 400.

FIG. 7 illustrates an exemplary motion of the finger 223 and the telescopic mechanisms 221b and 222b performed when the space between the fingers 221 and 222 is narrow. The motion process of the finger 223 and the telescopic mechanisms 221b and 222b is the same as that in FIG. 6.

Holding the holding target object 400 using the finger 223 is performed as follows, for example. First, the controller 103 operates the robot 200 such that the finger 223 comes into contact with the holding target object 400 with the fingers 221 and 222 closed (in a state where the space between the fingers 221 and 222 is the initial value). Subsequently, the controller 103 changes the position of the finger 223 and moves the holding target object 400 such that the holding target object 400 gets into the position and the posture where it can be held with the fingers 221 and 222 as needed. Subsequently, the controller 103 operates the robot 200 to gradually widen the space between the fingers 221 and 222 (such that the space becomes a value larger than the initial value). When the space between the fingers 221 and 222 is made wider than the width of the holding target object 400 (value at which the holding target object 400 can be held), the fingers 221 and 222 extend by gravity and move to the position where they can hold the holding target object 400. Subsequently, the controller 103 operates the robot 200 to narrow the space between the fingers 221 and 222, thereby holding the holding target object 400 with the fingers 221 and 222. Specific examples of the motion of holding the holding target object 400 will be described later.

Figure 8:
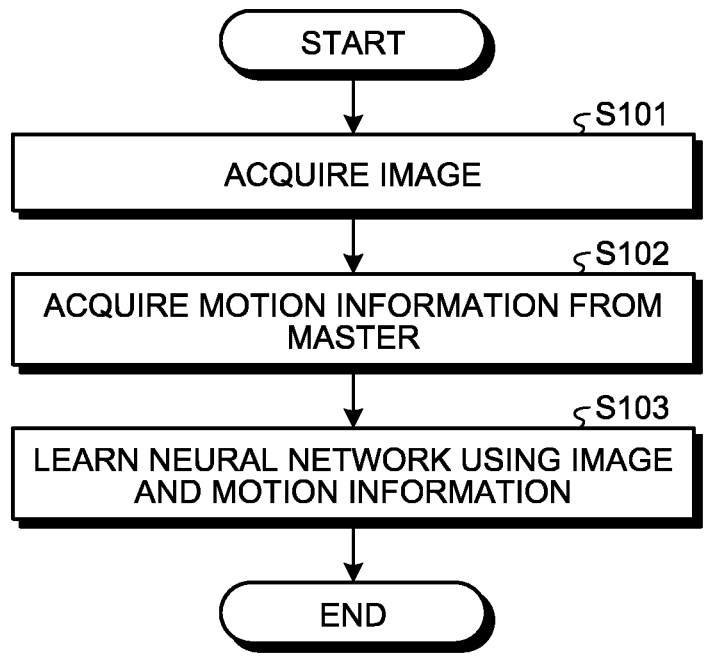
FIG. 8 is a flowchart of learning according to the first embodiment.

The following describes learning performed by the control device 100 according to the first embodiment having the configuration described above. FIG. 8 is a flowchart of an example of learning according to the first embodiment.

If learning is started, the image acquirer 101 acquires an image of the holding target object 400 and the hand of the robot 200S, for example, taken by the camera 300 (Step S101). The motion information acquirer 102 acquires the motion information from the robot 200M serving as a master that operates based on the operations performed by the user (Step S102). The learner 104 learns the neural network using the acquired image and the motion information (Step S103). The learner 104, for example, inputs the acquired image to the neural network and learns the parameters (e.g., weight) of the neural network such that the error between the motion information output from the neural network and the acquired motion information on the robot 200M is smaller.

Learning is repeatedly performed by changing conditions, such as the number of holding target objects 400, the positions and the postures of a plurality of holding target objects 400, and the relative positional relation of the holding target objects 400. By learning with a number of conditions, the control device 100 can learn the neural network such that it can output the motion information that enables appropriately holding the holding target object 400 under a variety of conditions.

The learner 104, for example, learns the neural network using the motion information obtained when the robot 200M is operated as follows: when there is no gap between the holding target object 400 (first target object) and another object (second target object), the robot 200M moves the holding target object 400 with the finger 223 in a direction in which a gap is formed between the holding target object 400 and the other object, inserts the finger 221 or 222 into the formed gap, and holds the holding target object 400. By using the neural network learned as described above, the control device 100 can control the robot 200 such that the robot 200 forms a gap into which the finger 221 or 222 can be inserted and appropriately holds the holding target object 400 in the same situation described above. In other words, the robot 200 can more appropriately hold the holding target object.

Figure 9:
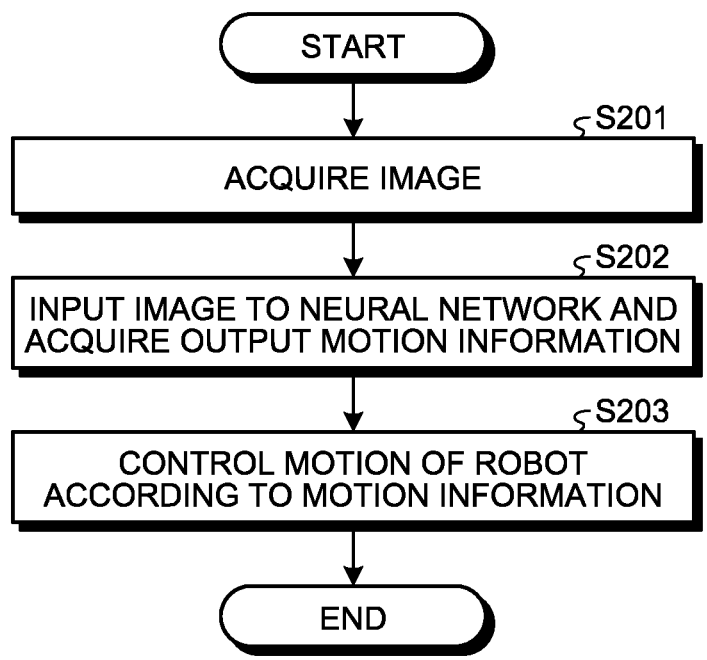
FIG. 9 is a flowchart of control according to the first embodiment.

The following describes control of the robot 200 performed by the control device 100 according to the first embodiment having the configuration described above. Control is processing for controlling the motion of the robot 200 using the learned neural network. FIG. 9 is a flowchart of an example of control according to the first embodiment.

The image acquirer 101 acquires an image of the holding target object 400 and the hand of the robot 200S, for example, taken by the camera 300 (Step S201). The controller 103 inputs the acquired image to the neural network and acquires the motion information output from the neural network (Step S202). The controller 103 controls the motion of the robot 200 such that the robot 200 gets into a motion state indicated by the output motion information (Step S203).

As described above, by using the neural network learned with a variety conditions, the control device 100 can control the robot 200 such that the robot 200 more appropriately holds the holding target object under the variety of conditions (states). When there is no gap between the holding target object 400 (first target object) and another object (second target object), the controller 103, for example, can operate the robot 200 as follows: the robot 200 moves the holding target object 400 with the finger 223 in a direction in which a gap is formed between the holding target object 400 and the other object, inserts the finger 221 or 222 into the formed gap, and holds the holding target object 400.

Figure 10:
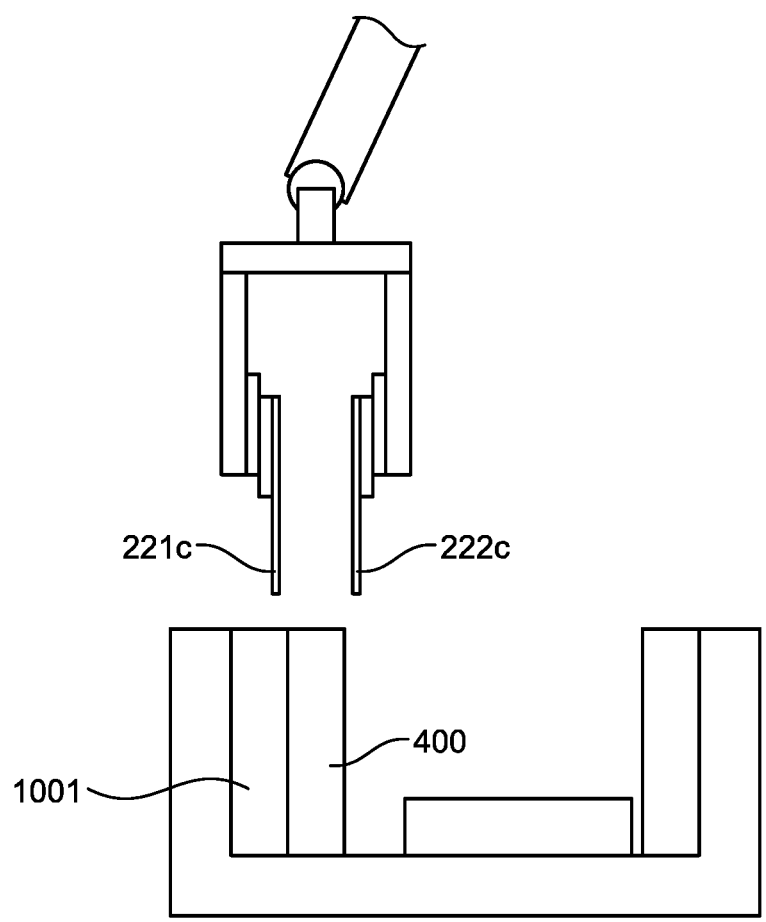
FIG. 10 is a schematic diagram of an example of a holding motion performed when a third finger is not provided.

The following describes specific examples of the motion of holding the holding target object 400 in greater detail. FIG. 10 is a schematic diagram of an example of the holding motion performed when a configuration not provided with the finger 223 (third finger) is used. In this configuration, if the holding target object 400 is in contact with an obstacle 1001 (e.g., another object), no gap is present between the holding target object 400 and the obstacle 1001. As a result, the robot 200 fails to insert the end portions 221c and 222c. In other words, the robot 200 fails to hold the holding target object 400 with the fingers 221 and 222. The obstacle 1001 is not limited to another object and may be a container accommodating the holding target object 400, for example.

Figure 11:
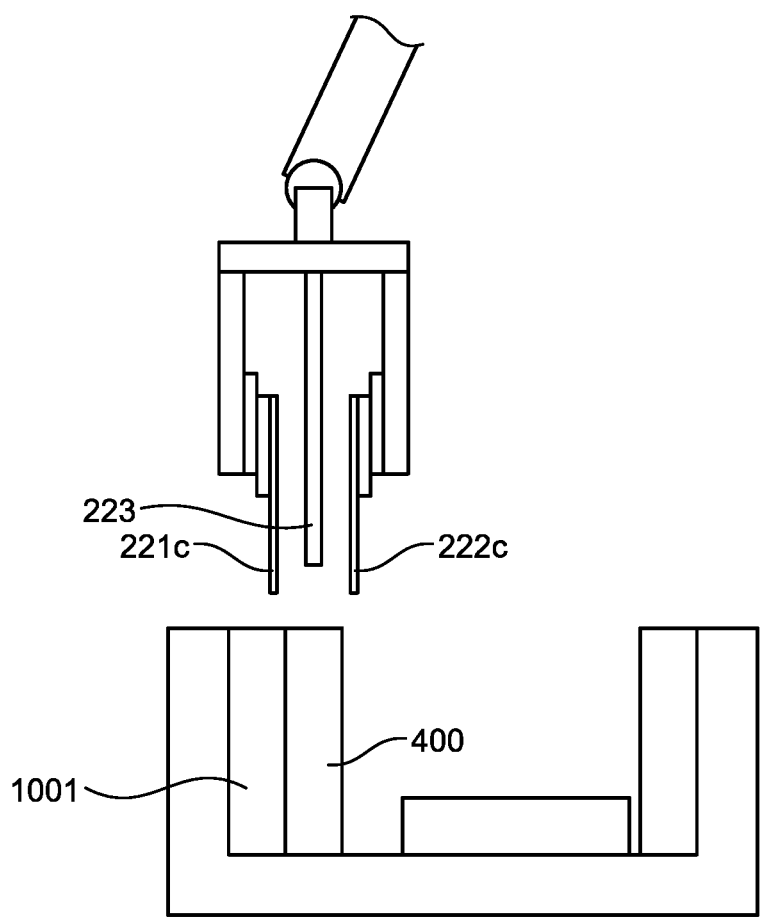
FIG. 11 is a schematic diagram of an example of a holding motion performed when the third finger is provided.

FIG. 11 is a schematic diagram of an example of the holding motion performed when a configuration provided with the finger 223 (third finger) is used that the present embodiment discloses. In this configuration, by tilting the holding target object 400 using the finger 223, for example, the robot 200 can form a gap between the obstacle 1001 and the holding target object 400. The robot 200 can insert the end portion 221c or 222c into the gap to hold the holding target object 400.

The following describes a specific example of the motion of holding the holding target object 400 and moving it into a second container with reference to FIGS. 12 to 21. The following describes an example where the controller 103 operates the robot 200 using the learned neural network. This example can be considered to be an example indicating a process of operating the master robot 200M by the user in learning.

Figure 12:
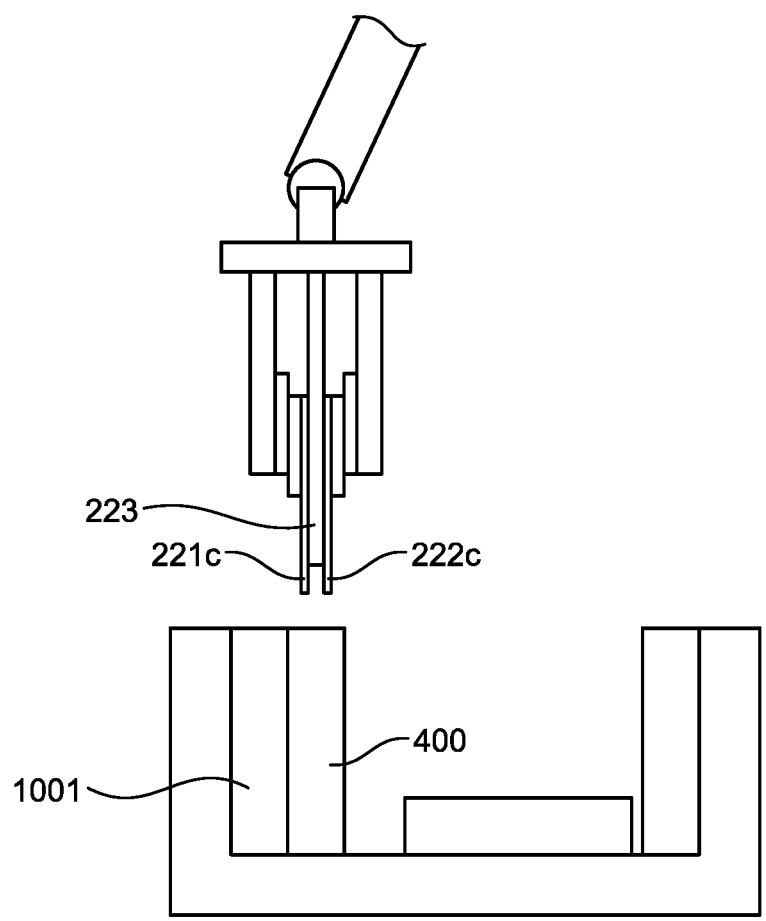
FIG. 12 is a schematic diagram for explaining a motion of holding a holding target object and moving it into a second container.

As illustrated in FIG. 12, the controller 103 operates the robot 200 such that the finger 223 comes closer to the upper surface of the holding target object 400 with the fingers 221 and 222 closed. At this time, the end portions 221c and 222c are lowered by gravity, and the positions of the ends are closer to the holding target object 400 than the finger 223 is.

Figure 13:
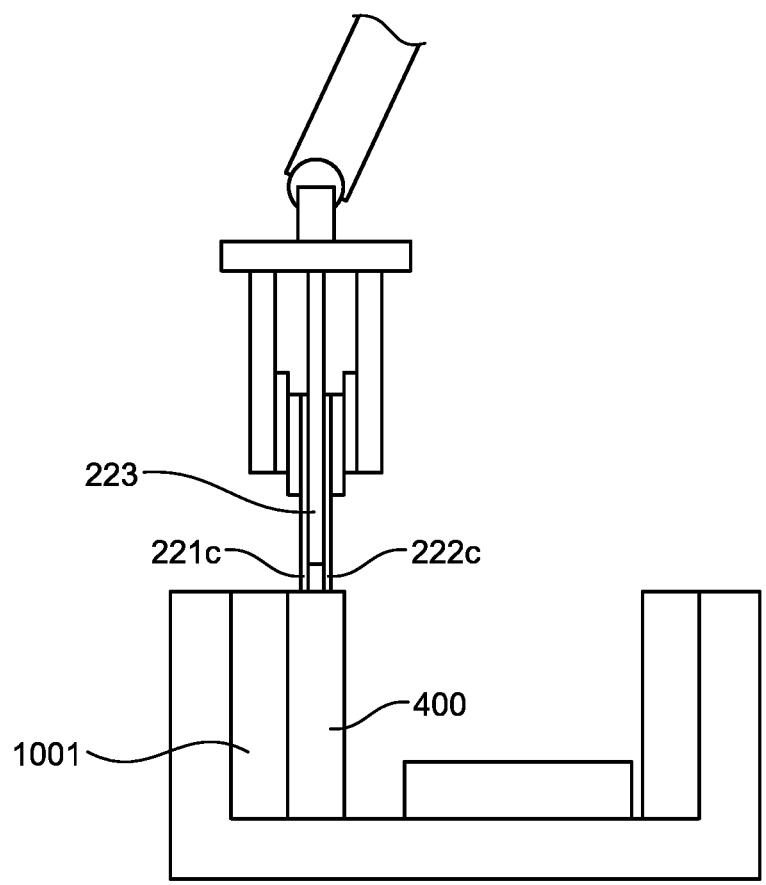
FIG. 13 is a schematic diagram for explaining a motion of holding the holding target object and moving it into the second container.
Figure 14:
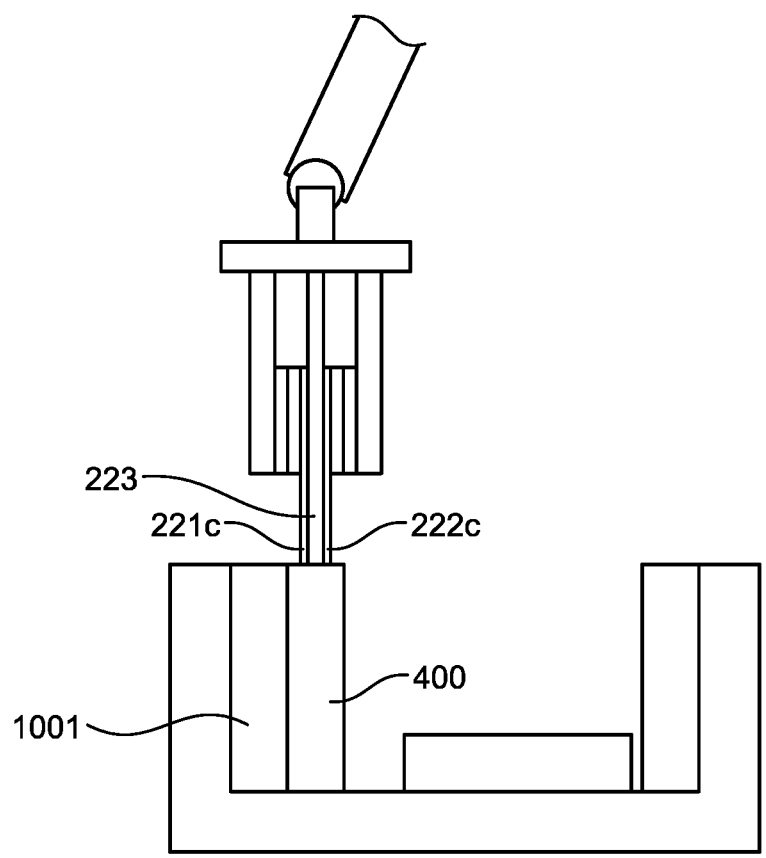
FIG. 14 is a schematic diagram for explaining a motion of holding the holding target object and moving it into the second container.
Figure 15:
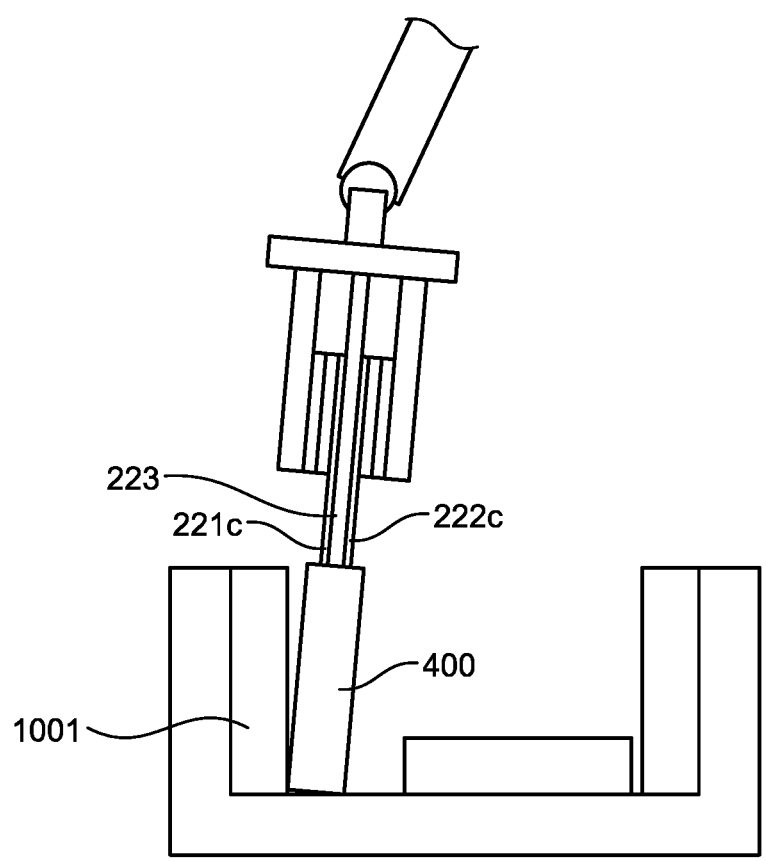
FIG. 15 is a schematic diagram for explaining a motion of holding the holding target object and moving it into the second container.
Figure 16:
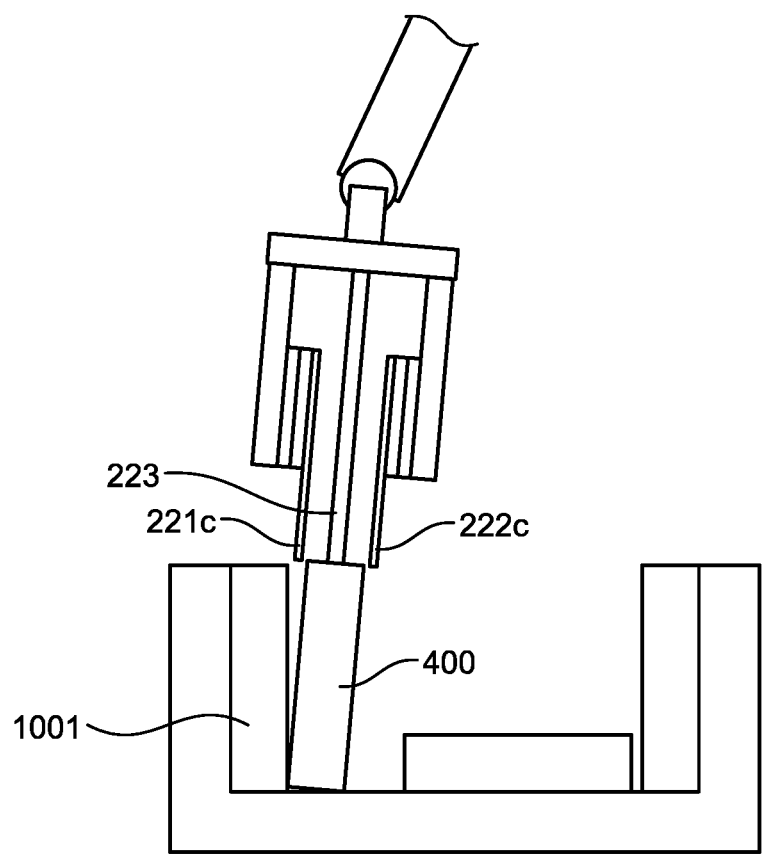
FIG. 16 is a schematic diagram for explaining a motion of holding the holding target object and moving it into the second container.

FIG. 13 illustrates a state where the end portions 221c and 222c are in contact with the upper surface of the holding target object 400. FIG. 14 illustrates a state where the finger 223 is also in contact with the upper surface of the holding target object 400. Subsequently, as illustrated in FIG. 15, the controller 103 causes the finger 223 to act on the holding target object 400, thereby tilting the holding target object 400. As illustrated in FIG. 16, the controller 103 widens the space between the fingers 221 and 222.

Figure 17:
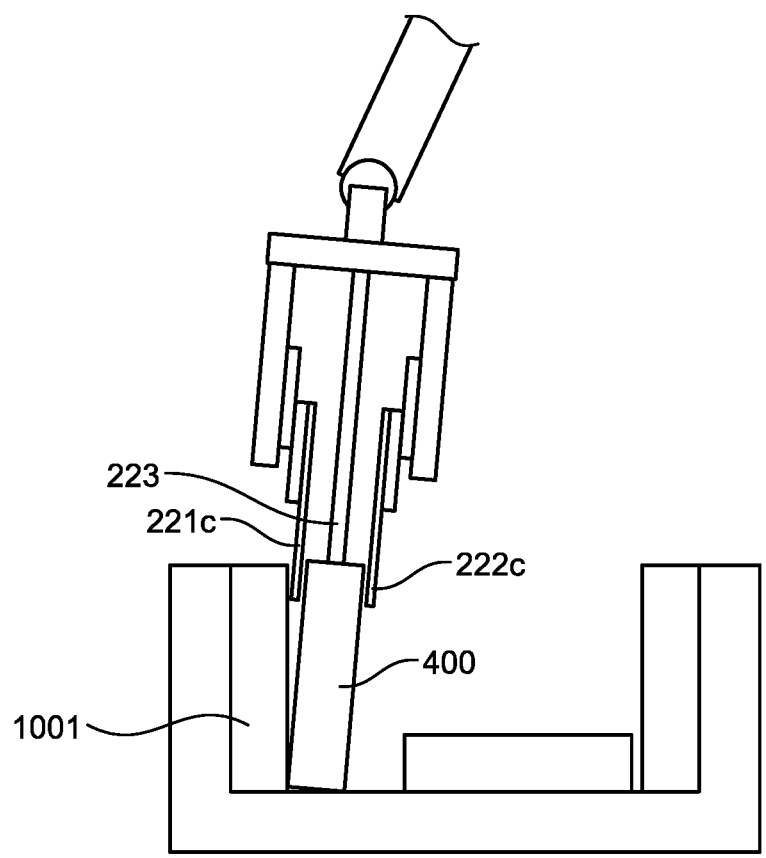
FIG. 17 is a schematic diagram for explaining a motion of holding the holding target object and moving it into the second container.
Figure 18:
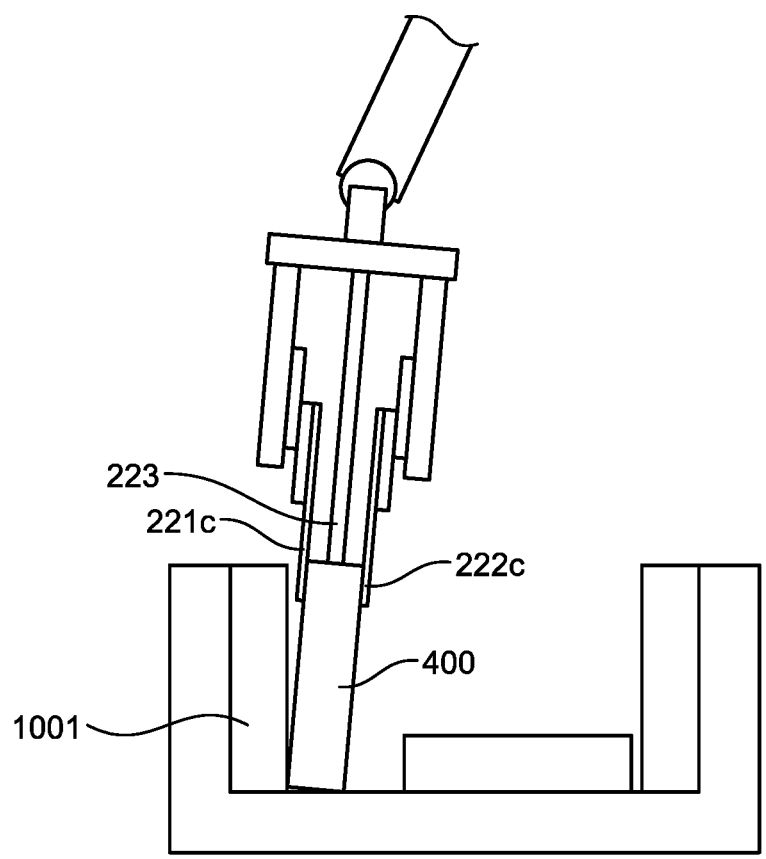
FIG. 18 is a schematic diagram for explaining a motion of holding the holding target object and moving it into the second container.

When the space between the fingers 221 and 222 is made larger than the width of the holding target object 400, the fingers 221 and 222 extend by the effect of gravity as illustrated in FIG. 17. Subsequently, as illustrated in FIG. 18, the controller 103 closes the fingers 221 and 222 to hold the holding target object 400.

Figure 19:
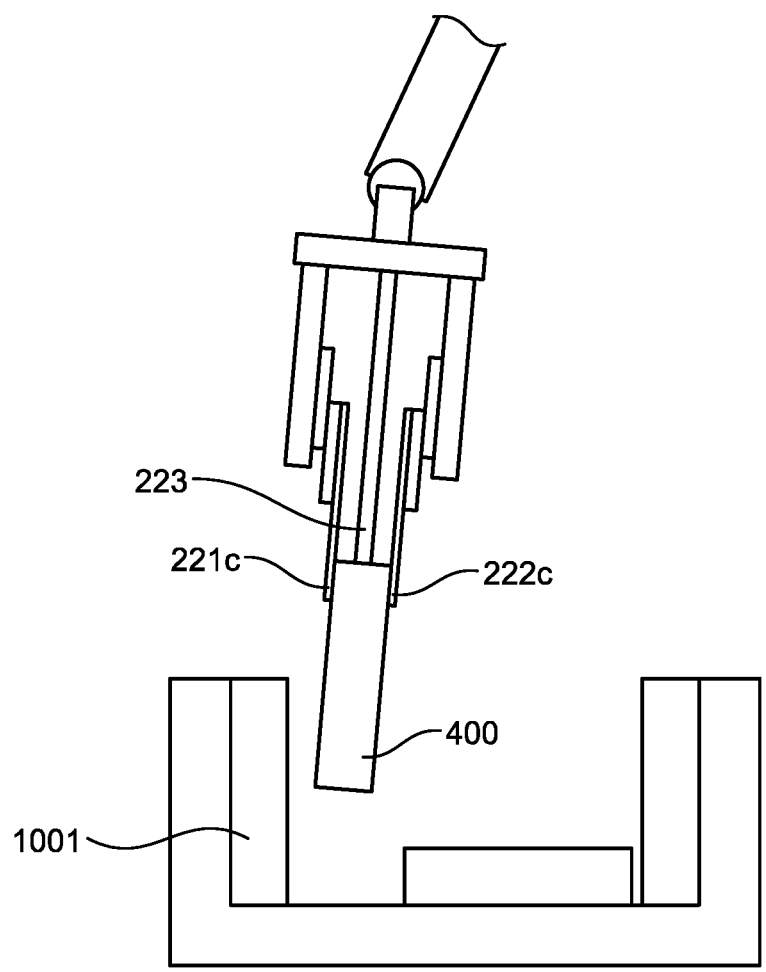
FIG. 19 is a schematic diagram for explaining a motion of holding the holding target object and moving it into the second container.
Figure 20:
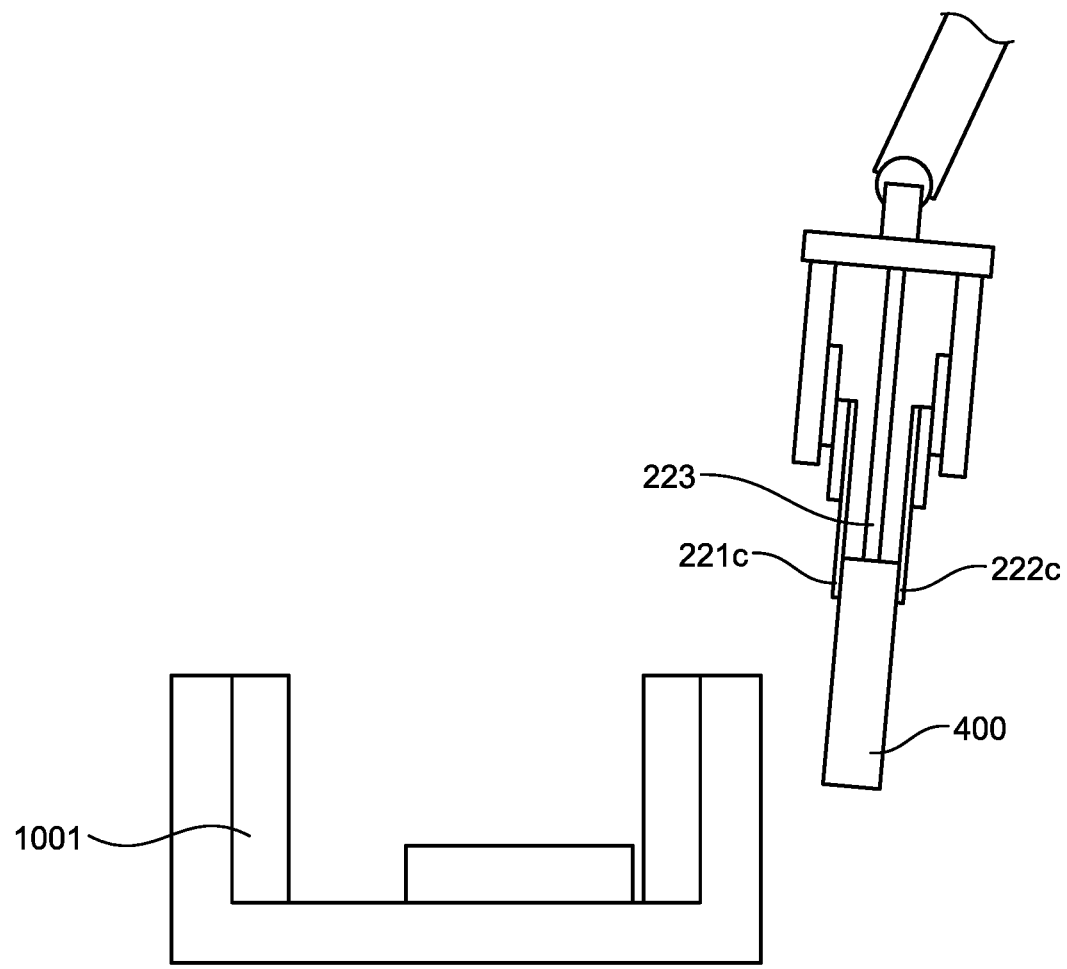
FIG. 20 is a schematic diagram for explaining a motion of holding the holding target object and moving it into the second container.
Figure 21:
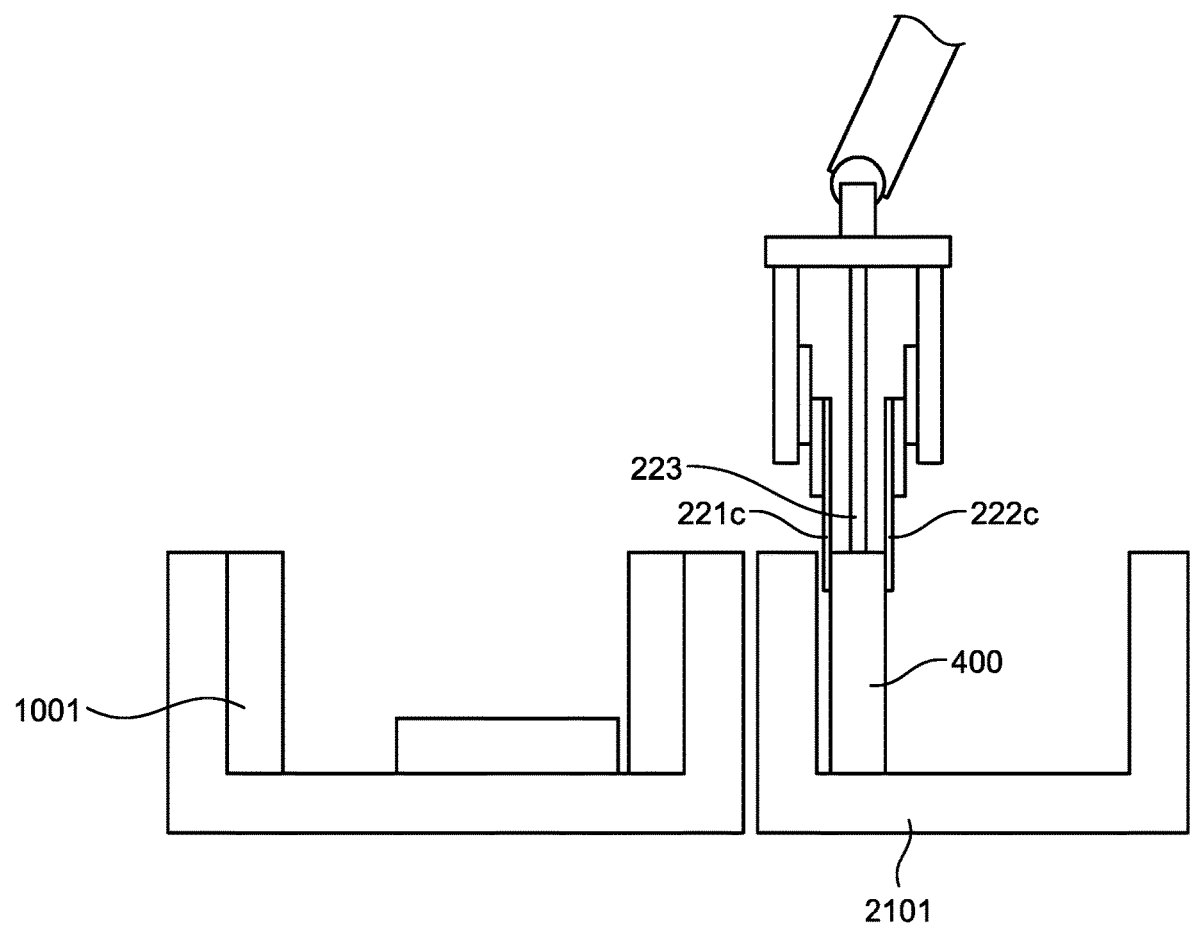
FIG. 21 is a schematic diagram for explaining a motion of holding the holding target object and moving it into the second container.

As illustrated in FIG. 19, the controller 103 lifts the holding target object 400 while holding it. As illustrated in FIG. 20, the controller 103 moves the holding target object 400 to the outside of the container. As illustrated in FIG. 21, the controller 103 places the holding target object 400 in a second container 2101. As described above, the robot 200 can hold the holding target object 400 placed with no gap therearound.

The following describes another specific example of the motion of holding the holding target object 400 and moving it into a second container with reference to FIGS. 22 to 25. FIGS. 22 to 25 are an example of a process of holding the holding target object 400 that has fallen down.

Figure 22:
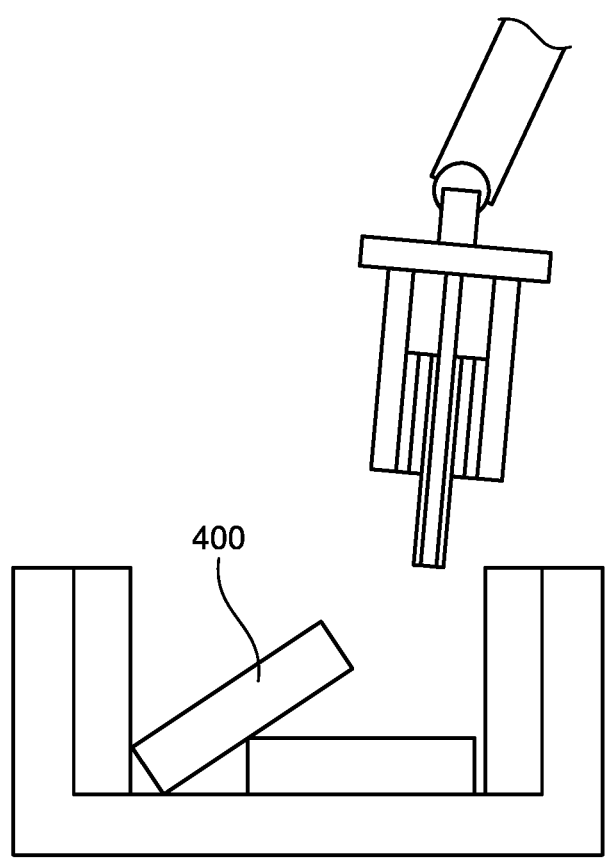
FIG. 22 is a schematic diagram for explaining a motion of holding the holding target object and moving it into the second container.
Figure 23:
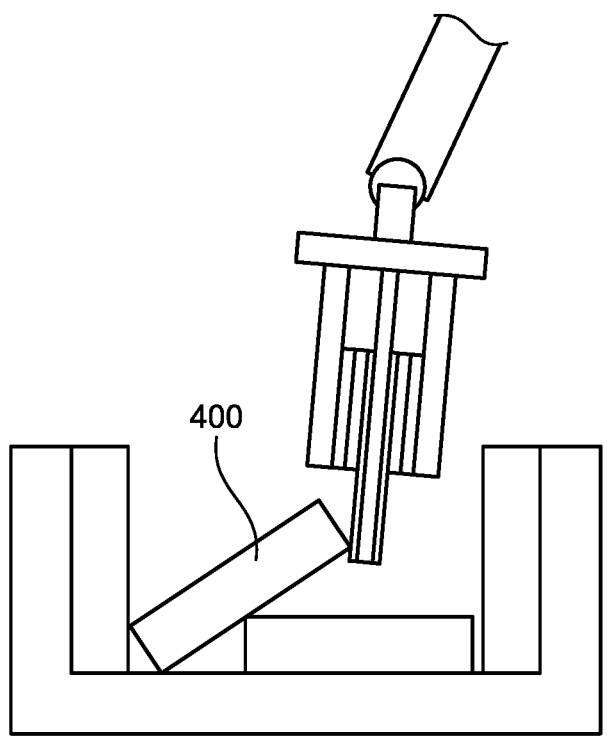
FIG. 23 is a schematic diagram for explaining a motion of holding the holding target object and moving it into the second container.
Figure 24:
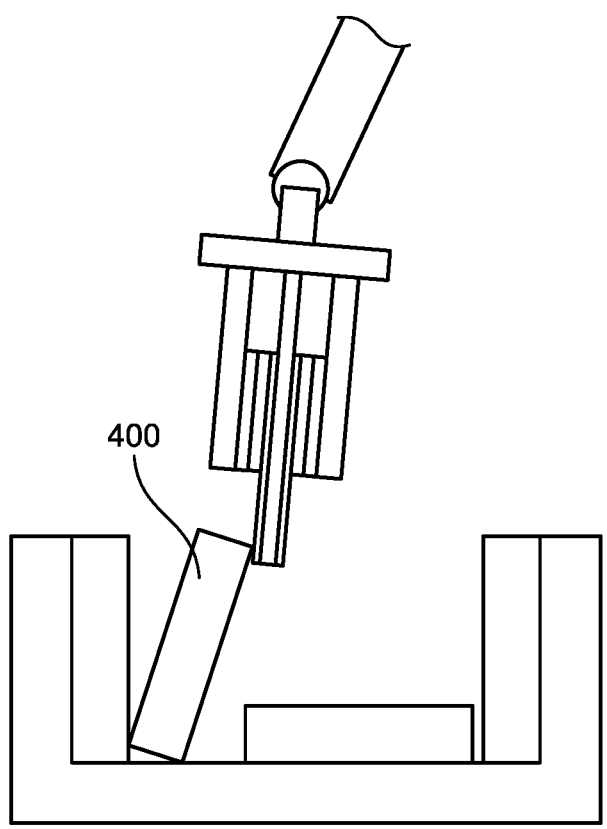
FIG. 24 is a schematic diagram for explaining a motion of holding the holding target object and moving it into the second container.
Figure 25:
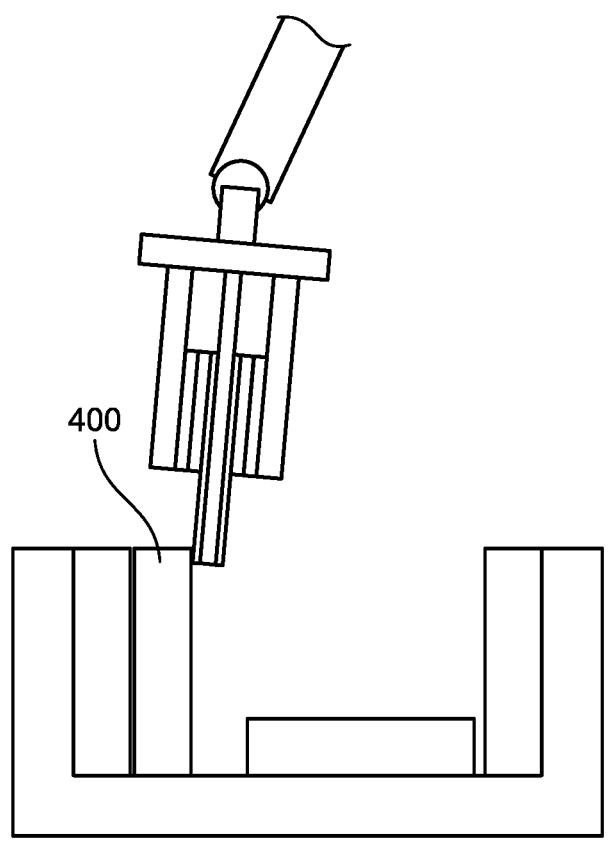
FIG. 25 is a schematic diagram for explaining a motion of holding the holding target object and moving it into the second container.

As illustrated in FIG. 22, when the holding target object 400 falls down, it is difficult to hold the holding target object 400 if it remains in the state. To address this, the controller 103 closes the fingers 221 and 222 to bring them into contact with the finger 223 and changes the position of the finger 223, thereby raising the holding target object 400. FIGS. 23 to 25 illustrate a process in which the holding target object 400 is being raised to stand. The subsequent process of moving the holding target object 400 into the second container (e.g., the container 2101 illustrated in FIG. 21) is the same as that described with reference to FIGS. 12 to 21.

Figure 26:
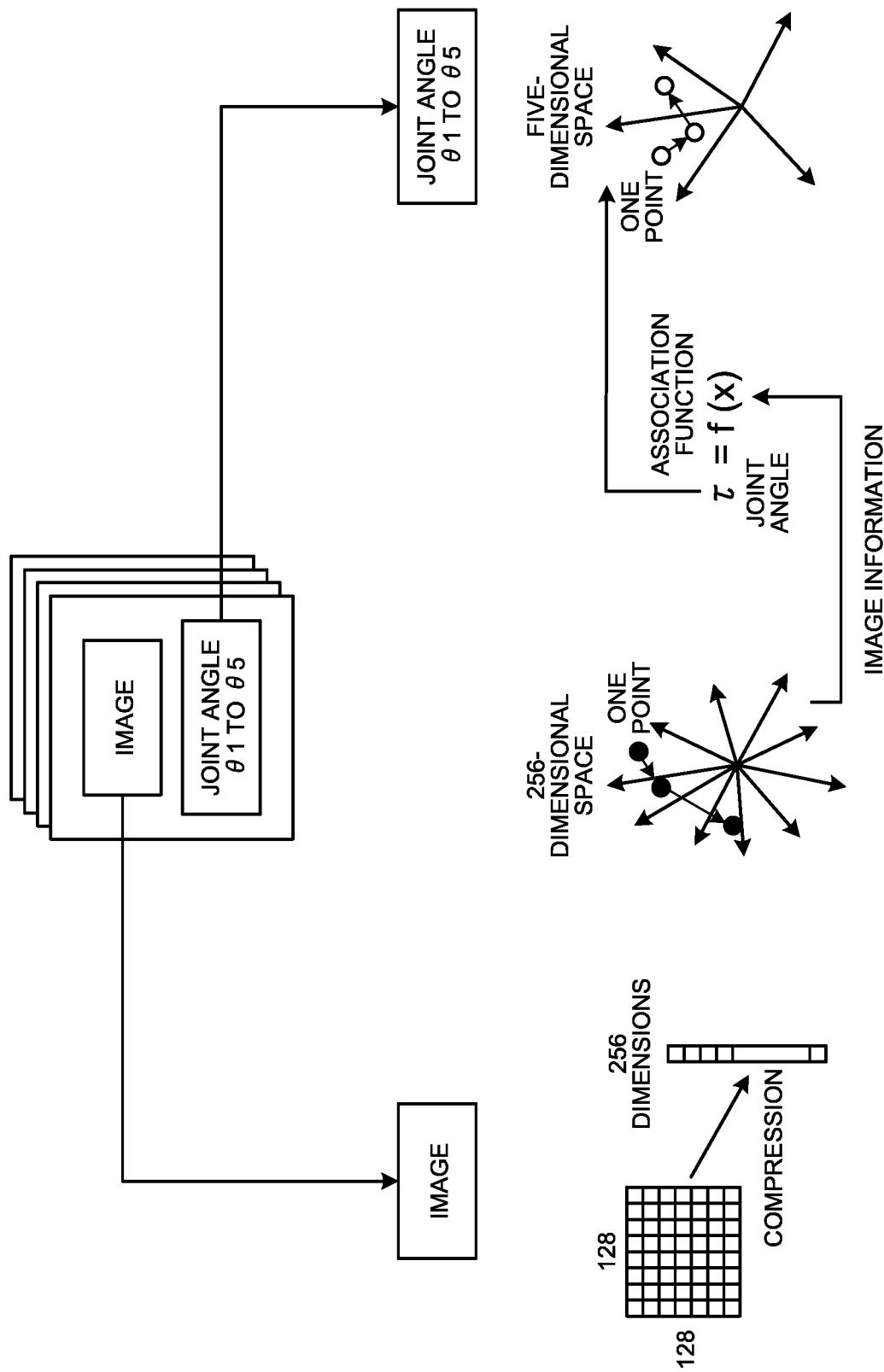
FIG. 26 is a diagram of an exemplary configuration of a model for deriving motion information on the robot.

The following describes a model for deriving the motion information on the robot 200. FIG. 26 is a diagram of an exemplary configuration of the model for deriving the motion information on the robot 200.

As described above, the robot system according to the present embodiment has a master-slave configuration. If the user operates the master robot 200M, the robot system can operate the slave robot 200S in the same manner as the operated robot 200M. The camera 300 images the motion of the robot 200S (arm joint and hand) and the holding target object 400 and outputs an image. The taken image is stored in the storage 121 in association with the joint angles of the respective joints of the robot 200 obtained when the image is taken.

The image may be used as data input to the model without any change, or a compressed image may be used as data input to the model. An image of 128×128 pixels, for example, is compressed into 256-dimensional image information using a technology such as variational auto encoder (VAE). In this case, the image information is represented by one point in the 256-dimensional space. Movement of the robot 200 and the holding target object 400 means continuous movement of one point in the 256-dimensional space. Movement of the point in the 256-dimensional space can be considered to represent movement of the holding target object 400 and movement of the hand.

If the number of joints of the robot 200 is five, the posture (motion information) of the robot 200 is represented by one point in five-dimensional space. Movement of the robot 200 means continuous movement of one point in the five-dimensional space.

The model for deriving the motion information from an image corresponds to a mapping function in which one point in the 256-dimensional space corresponds to one point in the five-dimensional space. FIG. 26 illustrates an example of mapping f for converting image information x into a joint angle $\tau$ (an example of the motion information).

When the robot 200 is moving, movement of one point in the 256-dimensional space and movement of one point in the five-dimensional space are synchronized time-series data. The mapping function for associating these pieces of time-series data (time-series data on a plurality of images or time-series data on a plurality of pieces of motion information) can be provided by a neural network, for example. Examples of the neural network include, but are not limited to long short-term memory (LSTM), etc.

Figure 27:
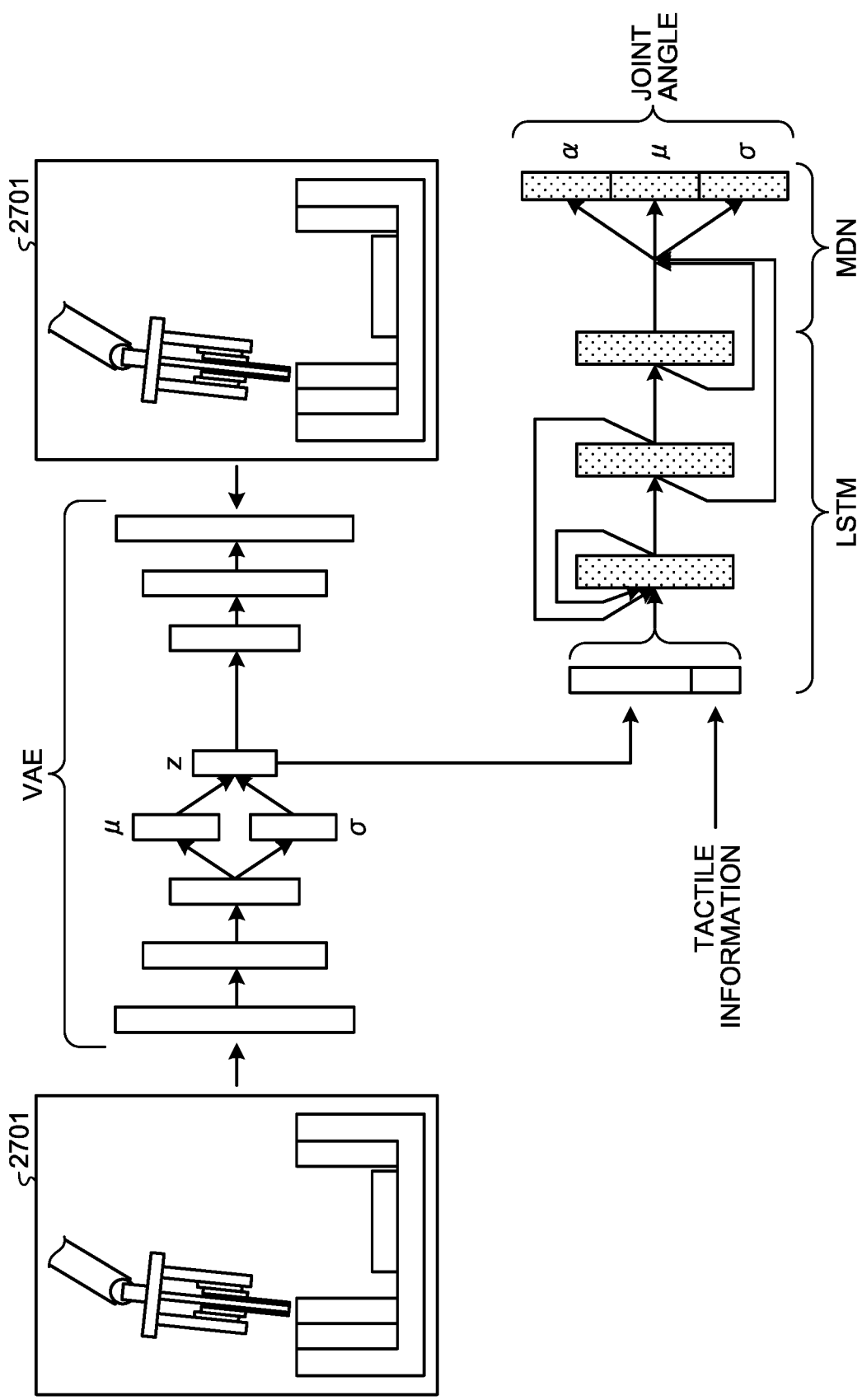
FIG. 27 is a diagram of an exemplary configuration of VAE and LSTM.

FIG. 27 is a diagram of an exemplary configuration of the VAE and the LSTM. The VAE receives an image 2701 (e.g., an image of 128×128 pixels) taken by the camera 300. The VAE is learned such that the error between output from the VAE and the image 2701 is smaller. In the process performed by the VAE, compressed image information (latent variable z) is generated. The VAE is also a neural network and requires a number of images for learning. Consequently, learning is performed by causing the master-slave configuration to perform the holding motion a plurality of times, creating data on a number of images and a number of joint angles (motion information), and inputting these pieces of data into the neural network.

The VAE has a function of forming average ($\mu$) and variance ($\sigma$) of data inside thereof and can form a mapping function using a number of pieces of data. By using this function, the VAE can smoothly connect movement of one point in the 256-dimensional space, thereby deriving the latent variable z.

The LSTM receives the latent variable z derived as described above as compressed image information. The method for deriving the compressed image information (latent variable z) is not limited to the VAE. Furthermore, a non-compressed image (e.g., the image 2701) may be input to the LSTM.

If a detection result (tactile information) can be acquired by a sensor or the like provided separately from the camera 300, the tactile information may also be input to the LSTM. Data obtained by combining the latent variable z and the tactile information, for example, may be input to the LSTM.

If no tactile information is acquired, the compressed image information (latent variable z) alone may be input to the LSTM.

The LSTM outputs a value indicating the joint angles of the respective joints of the robot 200, for example. Also for the LSTM, data obtained by performing the holding motion for a number of times is used. In the example of the model illustrated in FIG. 27, a mixed density network (MDN) is connected to the LSTM. The MDN statistically processes distribution of data on a number of joint angles output from the LSTM and outputs it. As described above, the model according to the present embodiment has a function of outputting information indicating distribution of predicted values (motion information such as the joint angle) for the input information.

Figure 28:
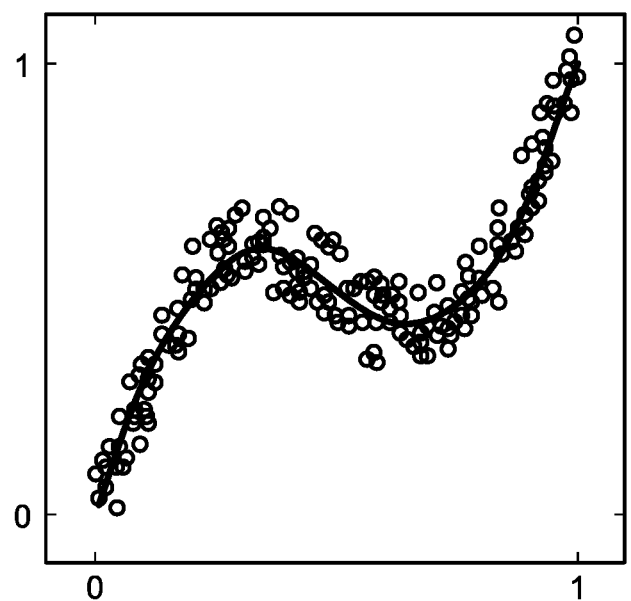
FIG. 28 is a diagram of an example of distribution of joint angles.
Figure 29:
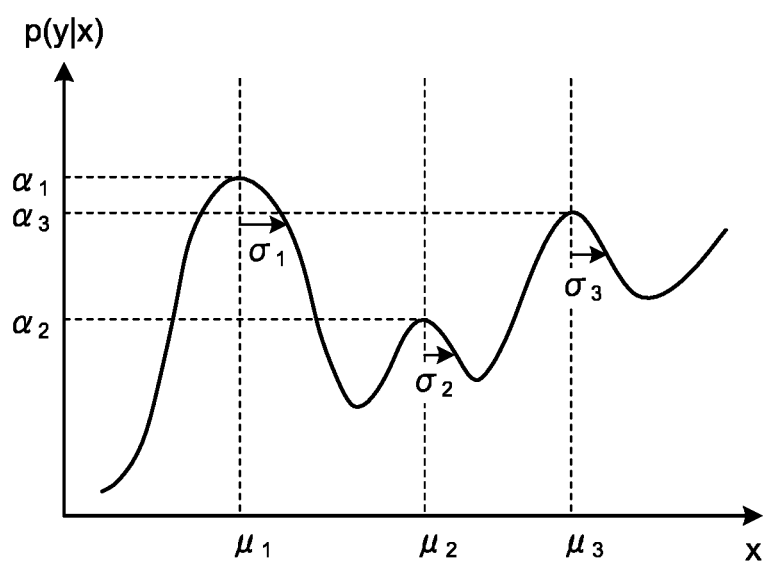
FIG. 29 is a diagram of an example of distribution represented by superposition of Gaussian distribution.
Figure 30:
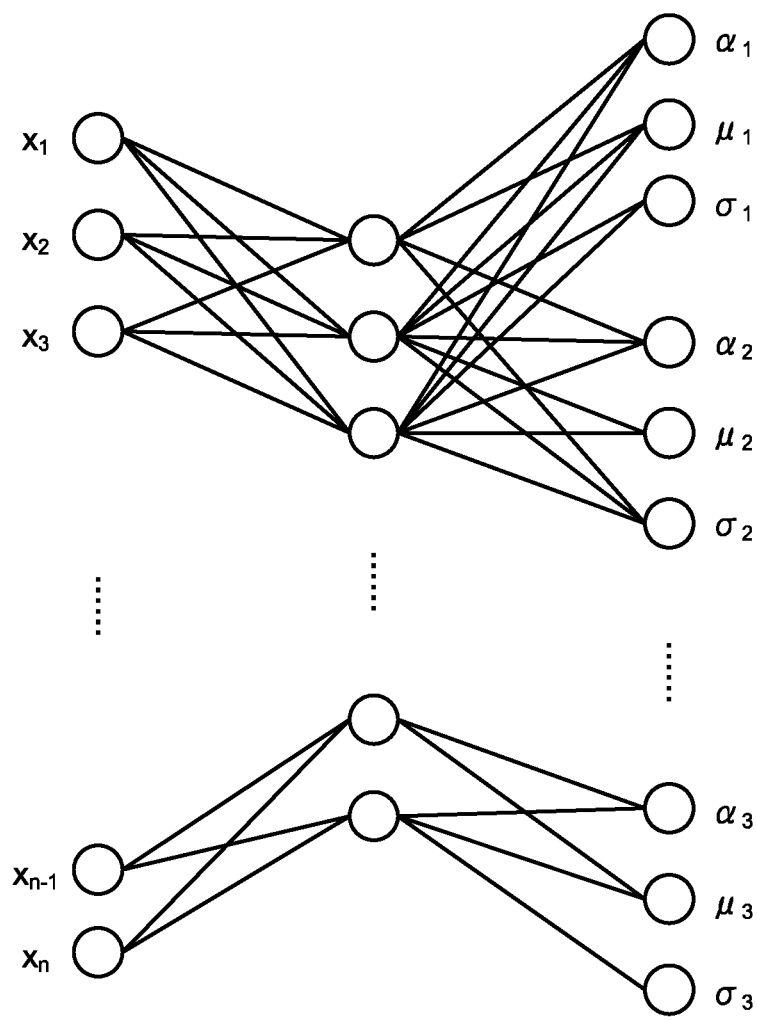
FIG. 30 is a diagram of an example of correspondence between input and output to and from MDN.

FIGS. 28 to 30 are diagrams for explaining the processing performed by the MDN. FIG. 28 is a diagram of an example of distribution of the joint angles. A circle corresponds to a value of the joint angle of a certain joint at a certain time. The curved line in FIG. 28 indicates a line approximating variations of a number of values. The MDN can more appropriately express the distribution of the joint angles.

In other words, the MDN represents the distribution of the joint angles by superposition of Gaussian distribution as indicated by Expressions (1) and (2). In the following expressions, c represents the number of joints of the robot 200.

$$p(y\mid x) = \sum_{i=1}^{m} \alpha_i(x) g_i(y\mid x) \quad (1)$$

$$g_i(y\mid x) = \frac{1}{(2\pi)^{\frac{c}{2}} \sigma_i(x)} \exp\left\{-\frac{(y-\mu_i(x))^2}{2\sigma_i(x)^2}\right\} \quad (2)$$

FIG. 29 is a diagram of an example of distribution represented by superposition of Gaussian distribution. The shape of the Gaussian distribution is determined by: $\mu_1$, $\mu_2$, $\mu_3$, ..., $\mu_m$ corresponding to the peak positions of the respective distributions, $\alpha_1$, $\alpha_2$, $\alpha_3$, ..., $\alpha_m$ corresponding to the heights of the respective distributions, and $\sigma_1$, $\sigma_2$, $\sigma_3$, ..., $\sigma_m$ corresponding to the spreads of the respective distributions. FIG. 29 illustrates an example of the distribution where m, which represents the number of distributions, is 3.

FIG. 30 is a diagram of an example of correspondence between input and output to and from the MDN. In FIG. 30, x represents input to the MDN (output from the LSTM), and $\alpha$, $\mu$, and $\sigma$ represent output from the MDN and correspond to $\alpha$, $\mu$, and $\sigma$ described with reference to FIG. 29. FIG. 30 illustrates an example of output corresponding to the joint angle of a certain joint, that is, one-dimensional joint angle information. If five joints are used, for example, five pieces of data illustrated in FIG. 30 (corresponding to five-dimensional joint angle information) are output.

By using the MDN, the control device 100 can smoothly connect and process pieces of data on a plurality of taught joint angles. As a result, the control device 100 can support joint angles not taught in learning, thereby improving the robustness in movement of the robot 200.

As described above, the robot system according to the first embodiment can move the holding target object to a position where it can be held using the finger provided besides the fingers for holding the holding target object. Consequently, the robot system can prevent the robot from failing to appropriately hold the holding target object.

Second Embodiment

A second embodiment describes an example of the robot system including a suction cup that can cause the holding target object to adhere thereto.

Figure 31:
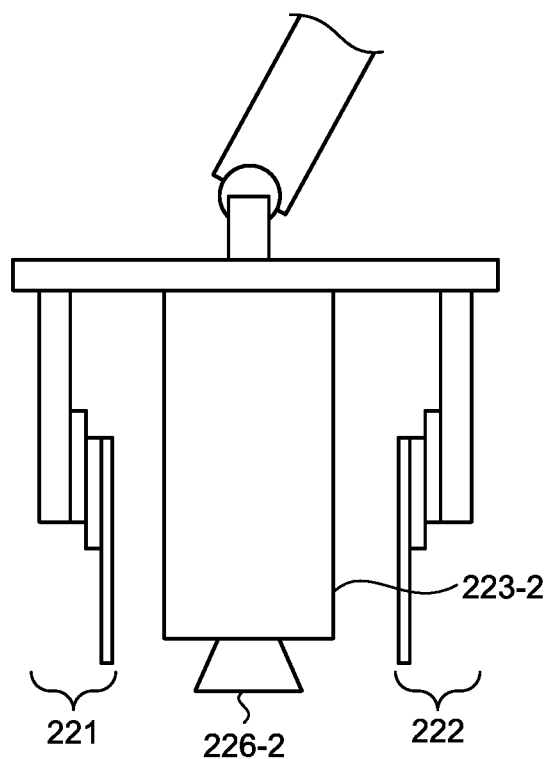
FIG. 31 is a schematic diagram of an exemplary configuration of a hand of the robot according to a second embodiment.

FIG. 31 is a schematic diagram of an exemplary configuration of the hand of the robot included in the robot system according to the present embodiment. As illustrated in FIG. 31, a finger 223-2 corresponding to the third finger according to the present embodiment includes a suction cup 226-2 at the end. Because the other components are the same as those according to the first embodiment, they are denoted by like reference numerals, and explanation thereof is omitted.

With the suction cup 226-2, the robot can more reliably hold the upper surface of the holding target object 400. Consequently, the finger 223-2 according to the present embodiment can translate the holding target object 400 in a case where the finger 223 with no suction cup according to the first embodiment fails to translate the holding target object 400, for example.

Figure 32:
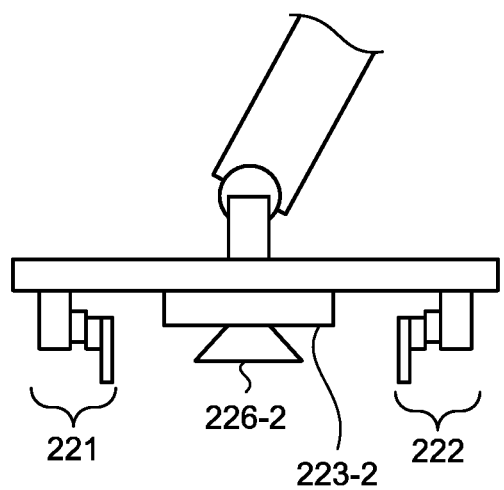
FIG. 32 is a schematic diagram of an exemplary configuration of the hand of the robot according to the second embodiment.

The lengths of the fingers 221, 222, and 223-2 may be shorter than those illustrated in FIG. 31, for example. FIG. 32 illustrates an example of a configuration including the fingers 221, 222, and 223-2 having shorter lengths than those illustrated in FIG. 31.

Figure 33:
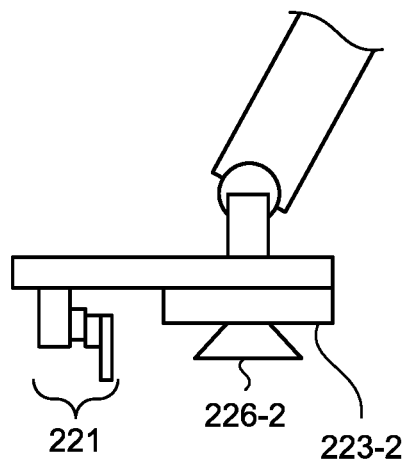
FIG. 33 is a schematic diagram of an exemplary configuration of the hand of the robot according to the second embodiment.

One of the fingers 221 and 222 is not necessarily provided. FIG. 33 illustrates an example of a configuration not including the finger 222. With this configuration, the robot also can stably hold the holding target object 400 with the suction cup 226-2 and the finger 221, for example.

Third Embodiment

A third embodiment describes an example of the robot system including a sensor different from the camera 300.

Figure 34:
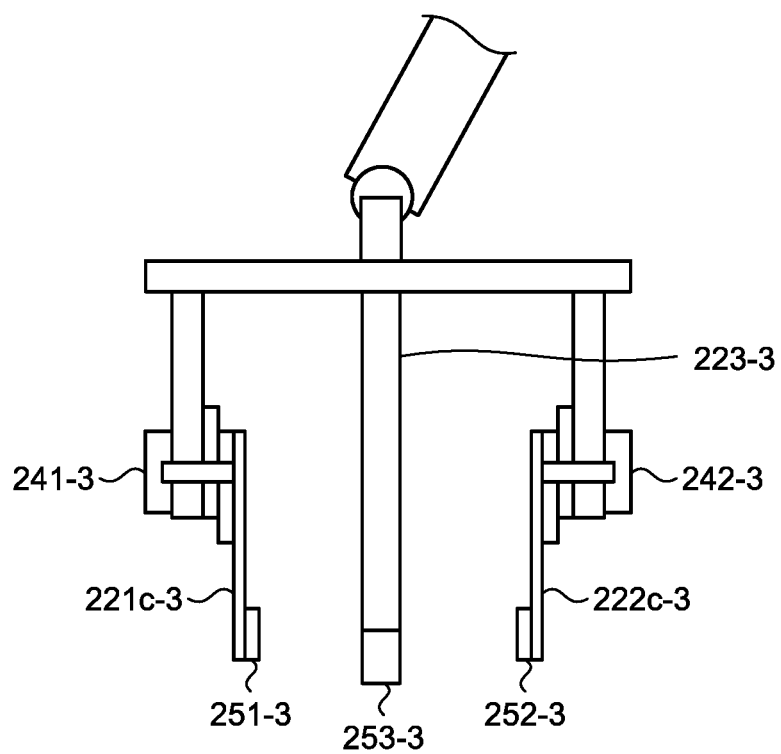
FIG. 34 is a schematic diagram of an exemplary configuration of the hand of the robot according to a third embodiment.

FIG. 34 is a schematic diagram of an exemplary configuration of the hand of the robot included in the robot system according to the present embodiment. As illustrated in FIG. 34, in the present embodiment further includes displacement sensors 241-3 and 242-3 and touch sensors 251-3, 252-3, and 253-3.

The displacement sensors 241-3 and 242-3 detect the amount of displacement (amount of movement) of end portions 221c-3 and 222c-3, respectively. The touch sensors 251-3, 252-3, and 253-3 are provided at the ends of the end portions 221c-3 and 222c-3 and a finger 223-3, respectively, and detect contact of an object or the like with themselves or the corresponding fingers.

Data resulting from measurement (detection) by these sensors can be used as part of the motion information. The data resulting from detection by the sensors can be used as the tactile information illustrated in FIG. 27. Consequently, the robot system can introduce the contact state of the hand with the holding target object 400 into learning, thereby enabling a more robust motion.

All the sensors (the displacement sensors 241-3 and 242-3 and the touch sensors 251-3, 252-3, and 253-3) are not necessarily provided, and only part thereof may be provided. One of the displacement sensors 241-3 and 242-3 and the touch sensors 251-3, 252-3, and 253-3 may be provided, for example. Only the detection information of part of the provided sensors may be used as the motion information.

As described above, the first to the third embodiments can reduce the possibility that the robot fails to appropriately hold the holding target object.

Figure 35:
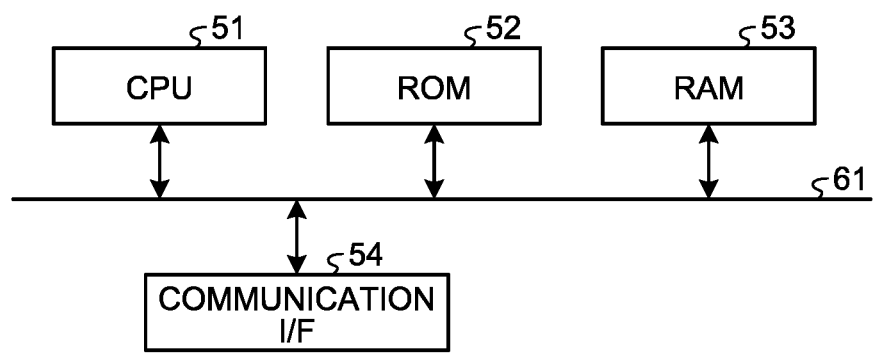
FIG. 35 is a diagram of a hardware configuration of a control device according to the first to the third embodiments.

The following describes a hardware configuration of the control device according to the first to the third embodiments with reference to FIG. 35. FIG. 35 is a diagram for explaining an exemplary hardware configuration of the control device according to the first to the third embodiments.

The control device according to the first to the third embodiments includes a control device such as a central processing unit 51, storage devices such as a read only memory (ROM) 52 and a random access memory (RAM) 53, a communication I/F 54 connected to a network to perform communications, and a bus 61 that connects these units.

The computer program executed in the control device according to the first to the third embodiments is embedded and provided in the ROM 52, for example.

The computer program executed in the control device according to the first to the third embodiments may be recorded in a computer-readable recording medium, such as a compact disc read only memory (CD-ROM), a flexible disk (FD), a compact disc recordable (CD-R), and a digital versatile disc (DVD), as an installable or executable file and provided as a computer program product.

The computer program executed in the control device according to the first to the third embodiments may be stored in a computer connected to a network, such as the Internet, and provided by being downloaded via the network. Furthermore, the computer program executed in the control device according to the first to the third embodiments may be provided or distributed via a network such as the Internet.

The computer program executed in the control device according to the first to the third embodiments can cause a computer to function as the units of the control device described above. The CPU 51 of the computer can read and execute the computer program from a computer-readable storage medium on a main memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A robot system comprising:
a robot including a plurality of fingers for holding a target object; and
a control device configured to control a motion of the robot, wherein the control device comprises:
one or more processors configured to
acquire an image of a first target object and a second target object taken by an imaging device, and
control the motion of the robot based on the image such that the robot moves the first target object with at least one finger included in the plurality of fingers in a direction in which a gap is formed between the first target object and the second target object, inserts at least one finger included in the plurality of fingers into the gap, and holds the first target object,
wherein the robot comprises:
a first finger having a telescopic mechanism, a second finger having a telescopic mechanism, and a third finger having no telescopic mechanism, and
a driver configured to change a space between the first finger and the second finger, and
the one or more processors move the first target object by changing a position of the third finger brought into contact with the first target object, insert the first finger into the gap, and control the driver such that the first target object is held with the first finger and the second finger.

2. The robot system according to claim 1, wherein the one or more processors
change a position of the robot until the third finger comes into contact with the first target object when the space between the first finger and the second finger is an initial value,
move the first target object by changing the position of the third finger with the third finger in contact with the first target object,
control the driver such that the space between the first finger and the second finger increases to a value larger than the initial value and a value at which the first target object is capable of being held after moving the first target object, and
control the driver such that the first target object is held with the first finger and the second finger after the first finger and the second finger move to a position where the first finger and the second finger are capable of holding the first target object.

3. The robot system according to claim 1, wherein the robot comprises a suction cup at an end of the third finger.

4. The robot system according to claim 1, wherein the one or more processors are configured to
acquire first motion information indicating a motion state of the robot, and
learn a model that receives input information based on the image of the target object and outputs second motion information using the acquired image and third motion information, the third motion information being the first motion information acquired when the robot is operated such that the robot moves the first target object with at least one finger included in the plurality of fingers in the direction in which the gap is formed between the first target object and the second target object, inserts at least one finger included in the plurality of fingers into the gap, and holds the first target object.

5. The robot system according to claim 4, wherein the model has a function of outputting information indicating distribution of predicted values for the input information.

6. The robot system according to claim 4, wherein
the robot further comprises a sensor configured to detect contact of an object with at least part of the fingers, and
the one or more processors acquire the first motion information including information resulting from detection by the sensor.

7. The robot system according to claim 6, wherein the sensor is at least one of a sensor configured to detect contact of the object with the first finger, a sensor configured to detect contact of the object with the second finger, and a sensor configured to detect contact of the object with the third finger.

8. The robot system according to claim 4, wherein
the robot comprises
- a support member supporting the first finger, the second finger, and the third finger,
- a moving member configured to move the first finger and the second finger relatively to the support member, and
- a sensor configured to detect an amount of movement of the first finger and the second finger by the moving member, and the one or more processors acquire the motion information including information resulting from detection by the sensor.

9. A computer program product having a non-transitory computer readable medium including programmed instructions, wherein the instructions, when executed by a computer included in a control device configured to control a motion of a robot including a plurality of fingers for holding a target object, cause the computer to perform:
- acquiring an image of a first target object and a second target object taken by an imaging device; and
- controlling the motion of the robot based on the image such that the robot moves the first target object with at least one finger included in the plurality of fingers in a direction in which a gap is formed between the first target object and the second target object, inserts at least one finger included in the plurality of fingers into the gap, and holds the first target object, wherein the robot comprises
- a first finder having a telescopic mechanism, a second finder having a telescopic mechanism, and a third finder having no telescopic mechanism, and
- a driver configured to change a space between the first finder and the second finder, and the instructions further cause the computer to perform
- moving the first target object by changing a position of the third finger brought into contact with the first target object,
- inserting the first finger into the gap, and
- controlling the driver such that the first target object is held with the first finger and the second finger.

10. The robot system according to claim 1, wherein
the telescopic mechanism of the first finger extends the first finger by gravity acting on the telescopic mechanism of the first finger, and
the telescopic mechanism of the second finger extends the second finger by gravity acting on the telescopic mechanism of the second finger.

* * * * *

UNITED STATES PATENT AND TRADEMARK OFFICE
CERTIFICATE OF CORRECTION

| | |
|---|---|
| PATENT NO. | : 11,820,023 B2 |
| APPLICATION NO. | : 17/005361 |
| DATED | : November 21, 2023 |
| INVENTOR(S) | : Atsushi Sugahara et al. |

It is certified that error appears in the above-identified patent and that said Letters Patent is hereby corrected as shown below:

In the Claims

In Claim 9, Column 16, Lines 5-7:
"a first finder having a telescopic mechanism, a second finder having a telescopic mechanism, and a third finder having no telescopic mechanism, and"
Should read:
--a first finger having a telescopic mechanism, a second finger having a telescopic mechanism, and a third finger having no telescopic mechanism, and--.

And in Claim 9, Column 16, Lines 8-9:
"a driver configured to change a space between the first finder and the second finder, and"
Should read:
--a driver configured to change a space between the first finger and the second finger, and--.

Signed and Sealed this
Thirtieth Day of April, 2024

*Katherine Kelly Vidal*

Katherine Kelly Vidal
*Director of the United States Patent and Trademark Office*